United States Patent
Olsson

(10) Patent No.: US 10,914,652 B2
(45) Date of Patent: Feb. 9, 2021

(54) LEAK DETECTION FOR HEAT EXCHANGER PLATE

(71) Applicant: WCR Inc., Fairborn, OH (US)

(72) Inventor: Mattias Olsson, Washington Court House, OH (US)

(73) Assignee: WCR, INC., Fairborn, OH (US)

(*) Notice: Subject to any disclaimer, the term of this patent is extended or adjusted under 35 U.S.C. 154(b) by 130 days.

(21) Appl. No.: 15/994,363

(22) Filed: May 31, 2018

(65) Prior Publication Data
US 2019/0368963 A1 Dec. 5, 2019

(51) Int. Cl.
*G01M 3/22* (2006.01)
*F28F 3/10* (2006.01)
*G01M 3/20* (2006.01)

(52) U.S. Cl.
CPC ............ *G01M 3/226* (2013.01); *F28F 3/10* (2013.01); *G01M 3/205* (2013.01)

(58) Field of Classification Search
CPC .... G01M 3/228; G01M 3/229; G01M 3/3227; G01M 3/02; G01M 3/106; G01M 3/148; G01M 3/188; G01M 3/226; G01M 3/26; G01N 21/894
USPC ..................................... 73/40–49.8
See application file for complete search history.

(56) References Cited

U.S. PATENT DOCUMENTS

| | | | | |
|---|---|---|---|---|
| 3,027,753 A | * | 4/1962 | Harder, Jr. ............ | G01M 3/027 73/40.7 |
| 3,087,327 A | * | 4/1963 | Kägi ........................ | F28D 7/08 73/40.7 |
| 3,254,526 A | * | 6/1966 | Yarbrough ............... | G01M 3/38 73/40 |
| 3,343,404 A | * | 9/1967 | La Rosa ................ | G01M 3/363 73/49.3 |
| 3,425,264 A | * | 2/1969 | Frei ........................ | F22B 37/421 73/40.5 R |

(Continued)

FOREIGN PATENT DOCUMENTS

| | | |
|---|---|---|
| CN | 201051040 Y | 4/2008 |
| CN | 201993206 U | 9/2011 |

(Continued)

OTHER PUBLICATIONS

Heat Exchanger Leak Detection/Plate Dye Testing, WCR Heat Exchanger Services, Jan. 12, 2014. (Year: 2014).*

(Continued)

*Primary Examiner* — David A. Rogers
(74) *Attorney, Agent, or Firm* — Buchanan Ingersoll & Rooney PC

(57) ABSTRACT

A method for detecting a leak in a heat exchanger plate includes positioning the heat exchanger plate between a first fixture and a second fixture to create both a first sealed space between the heat exchanger plate and the first fixture and a second sealed space between the heat exchanger plate and the second fixture. The first sealed space is on one side of the heat exchanger plate and the second sealed space is on the other side of the heat exchanger plate. The method includes supplying an inert gas to the second sealed space, drawing a vacuum in the first sealed space, and detecting whether the first sealed space includes the inert gas. The presence of inert gas indicates the plate is not leak-tight.

19 Claims, 9 Drawing Sheets

(56) References Cited

U.S. PATENT DOCUMENTS

| | | | | |
|---|---|---|---|---|
| 3,667,281 A * | 6/1972 | Pfeifer | G01M 3/3218 | 73/37 |
| 3,695,301 A * | 10/1972 | Pittman | F16L 55/103 | 138/97 |
| 3,751,989 A * | 8/1973 | Briggs | G01M 3/20 | 73/40.7 |
| 3,949,598 A * | 4/1976 | Bergstrand | G01M 3/2884 | 73/49.2 |
| 3,954,003 A * | 5/1976 | Dobbins | G01M 3/26 | 73/40 |
| 4,409,818 A * | 10/1983 | Wyslotsky | G01M 3/363 | 73/49.3 |
| 4,584,877 A * | 4/1986 | Brayman | G01M 3/229 | 73/40.7 |
| 4,593,554 A * | 6/1986 | Aarts | G01M 3/329 | 73/45.4 |
| 4,688,627 A * | 8/1987 | Jean-Luc | F22B 37/421 | 165/11.1 |
| 4,791,806 A * | 12/1988 | Wade | G01M 3/205 | 73/40.7 |
| 4,862,731 A * | 9/1989 | Gates | G01M 3/226 | 73/40.7 |
| 4,901,558 A * | 2/1990 | Leining | G01M 3/363 | 73/45.4 |
| 4,934,180 A * | 6/1990 | Hulsman | G01M 3/366 | 73/49.3 |
| 5,068,074 A * | 11/1991 | De Rego | B29C 70/82 | 264/257 |
| 5,095,738 A * | 3/1992 | Roeschlaub | G01M 3/26 | 73/49.7 |
| 5,345,812 A * | 9/1994 | Haboian | G01M 3/2876 | 137/312 |
| 5,373,729 A * | 12/1994 | Seigeot | G01M 3/227 | 73/40.7 |
| 5,835,976 A * | 11/1998 | Kent | G01M 3/228 | 73/40.7 |
| 5,850,036 A * | 12/1998 | Giromini | G01M 3/202 | 73/40 |
| 5,872,308 A * | 2/1999 | Bowling | G01M 3/188 | 73/40 |
| 5,894,225 A * | 4/1999 | Coffin | G01R 31/2887 | 324/754.15 |
| 6,009,745 A * | 1/2000 | Shaw | G01M 3/042 | 165/11.1 |
| 6,314,794 B1 * | 11/2001 | Seigeot | G01M 3/228 | 73/40 |
| 6,321,589 B1 * | 11/2001 | Regimand | G01N 9/02 | 383/42 |
| 6,354,142 B1 * | 3/2002 | Nothhelfer | G01M 3/227 | 73/40.7 |
| 6,450,009 B1 * | 9/2002 | Hartikainen | G01N 15/0826 | 73/38 |
| 6,520,002 B2 * | 2/2003 | Bucey | G01M 3/228 | 73/40 |
| 6,578,407 B1 * | 6/2003 | McTaggart | G01M 3/025 | 73/40 |
| 6,732,571 B1 * | 5/2004 | Flosbach | G01M 3/20 | 340/605 |
| 6,817,228 B2 * | 11/2004 | Upton | F16J 15/004 | 277/318 |
| 6,895,811 B2 * | 5/2005 | Carey | G01M 3/04 | 73/159 |
| 6,955,076 B1 * | 10/2005 | Widt | G01M 3/227 | 73/40.7 |
| 7,043,966 B2 * | 5/2006 | Kuehn | G01M 3/3281 | 73/40 |
| 7,150,180 B2 * | 12/2006 | Werner | G01M 3/22 | 73/40.7 |
| 7,159,449 B2 * | 1/2007 | Pedersen | G01M 3/228 | 73/40.7 |
| 7,257,990 B2 * | 8/2007 | Bujas | G01N 15/0826 | 73/38 |
| 7,454,956 B1 * | 11/2008 | LoPresti | G01M 3/3227 | 165/11.1 |
| 7,500,382 B2 * | 3/2009 | Werner | G01M 3/228 | 73/46 |
| 7,568,516 B2 * | 8/2009 | Bergqvist | F16J 15/064 | 165/11.1 |
| 7,857,036 B2 * | 12/2010 | Bergqvist | F16J 15/064 | 165/11.1 |
| 7,886,580 B2 * | 2/2011 | Kumar | G01M 3/3227 | 73/40.7 |
| 8,074,491 B2 * | 12/2011 | Martino | G01M 3/229 | 73/38 |
| 8,261,593 B1 * | 9/2012 | Sanders | G01M 3/3245 | 73/40.5 R |
| 8,291,748 B2 * | 10/2012 | Kumar | G01M 3/3227 | 73/40.7 |
| 8,776,866 B2 * | 7/2014 | Cederberg | F28F 3/083 | 165/11.1 |
| 9,459,174 B1 * | 10/2016 | Purushothman | G01M 3/02 | |
| 9,739,546 B2 * | 8/2017 | Bertilsson | G01M 3/40 | |
| 9,829,259 B2 * | 11/2017 | Nyander | F28F 3/08 | |
| 10,309,862 B2 * | 6/2019 | Decker | G01M 3/26 | |
| 10,401,251 B2 * | 9/2019 | Van Triest | G01M 3/02 | |
| 10,458,879 B2 * | 10/2019 | Bowling | G01M 3/2815 | |
| 2003/0034146 A1 * | 2/2003 | Kaufman | G01M 3/3227 | 165/11.1 |
| 2003/0056572 A1 * | 3/2003 | Werner | G01M 3/22 | 73/40.7 |
| 2004/0129061 A1 * | 7/2004 | Rabelle | G01M 3/3227 | 73/40 |
| 2005/0109083 A1 * | 5/2005 | Werner | G01M 3/22 | 73/40.7 |
| 2006/0236755 A1 * | 10/2006 | Bujas | G01N 15/0826 | 73/38 |
| 2007/0125156 A1 * | 6/2007 | Werner | G01M 3/228 | 73/40.7 |
| 2008/0053200 A1 * | 3/2008 | Dhellemmes | G01M 3/027 | 73/49.8 |
| 2008/0073054 A1 * | 3/2008 | Bergqvist | F16J 15/064 | 165/11.1 |
| 2008/0196873 A1 * | 8/2008 | Svensson | F28F 3/083 | 165/167 |
| 2008/0295579 A1 * | 12/2008 | Safai | G01M 3/363 | 73/40 |
| 2009/0025456 A1 * | 1/2009 | Muller | G01M 3/229 | 73/49.2 |
| 2014/0013828 A1 * | 1/2014 | Kiest, Jr. | G01M 3/223 | 73/40.7 |
| 2015/0122468 A1 | 5/2015 | Bertilsson et al. | | |

FOREIGN PATENT DOCUMENTS

| | | | | |
|---|---|---|---|---|
| CN | 203572621 U | 4/2014 | | |
| CN | 103822761 A | 5/2014 | | |
| CN | 203824720 U | 9/2014 | | |
| CN | 205038024 U | 2/2016 | | |
| CN | 205404063 U | 7/2016 | | |
| CN | 206430872 U | 8/2017 | | |
| EP | 0556542 A2 * | 8/1993 | | G01M 3/20 |
| EP | 580524 A1 * | 1/1994 | | |
| FR | 2973876 B1 * | 10/2013 | | G01M 3/228 |
| GB | 1518363 A | 7/1978 | | |
| WO | WO-2006093935 A2 * | 9/2006 | | G01M 3/226 |

OTHER PUBLICATIONS

Tormach, 31185—Vacuum Table Kit, available at https://www.tormach.com/store/index.php?app=ecom&ns=prodshow&ref=31185, exact publication date unknown, but available on the internet on or before Mar. 29, 2018 (2 pages).

Nolek AB, "Integrated Systems for: Heat Exchangers", available at https://www.nolek.com/wp-content/uploads/2015/09/heat-exchangers.pdf, exact publication date unknown, but available on the internet on or before Mar. 29, 2018 (2 pages).

(56) References Cited

OTHER PUBLICATIONS

Vacuum Technology Incorporated, "Helium Leak Testing Station for Heat Exchangers", available at https://www.vacuumtechnology.com/vti-articles/helium-leak-testing-station-for-heat-exchangers/, Apr. 28, 2015 (3 pages).
English translation of Chinese Office Action dated Nov. 3, 2020 issued by the Chinese Patent Office in corresponding Chinese Patent Application No. 201910464437.3 (13 pages).

* cited by examiner

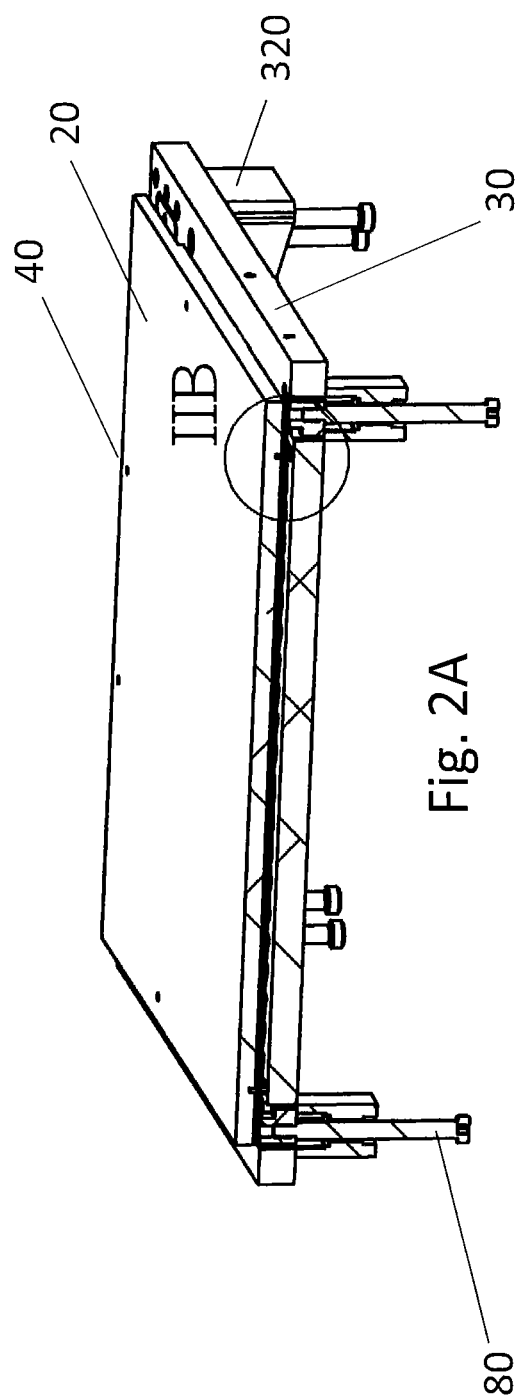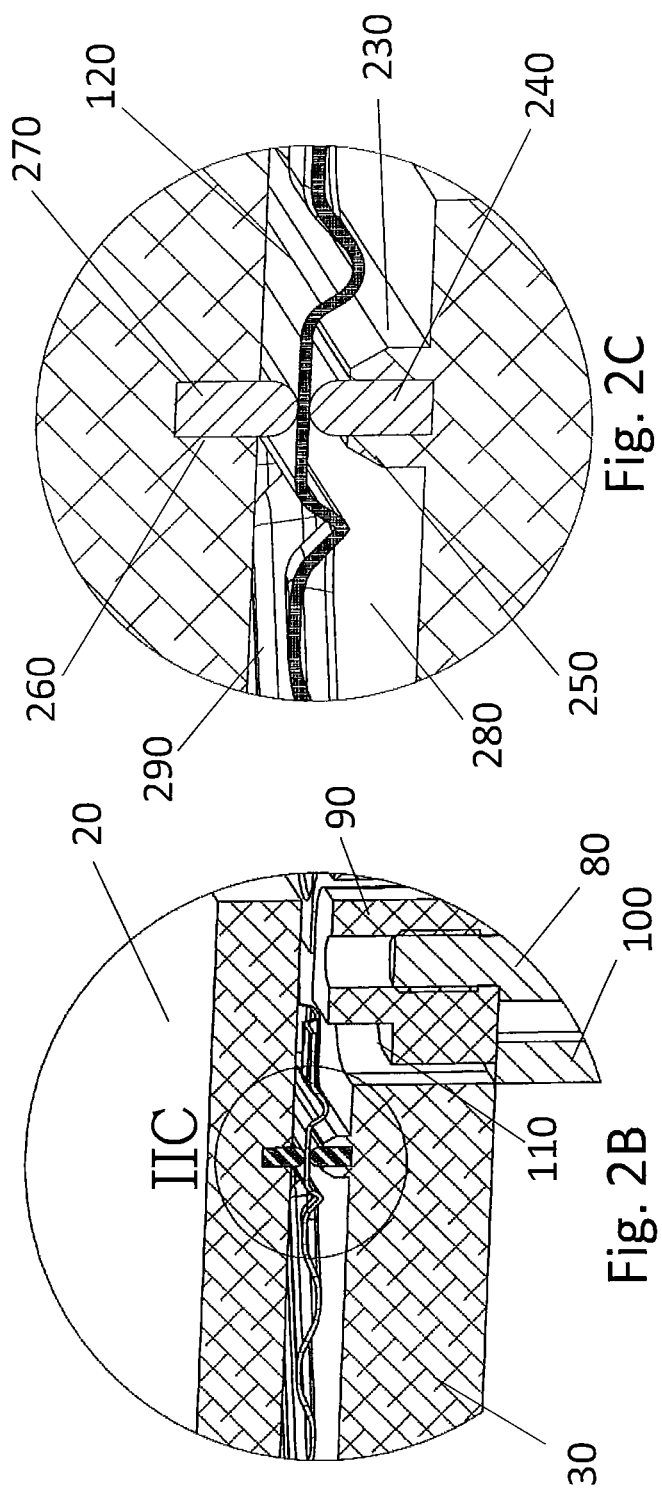

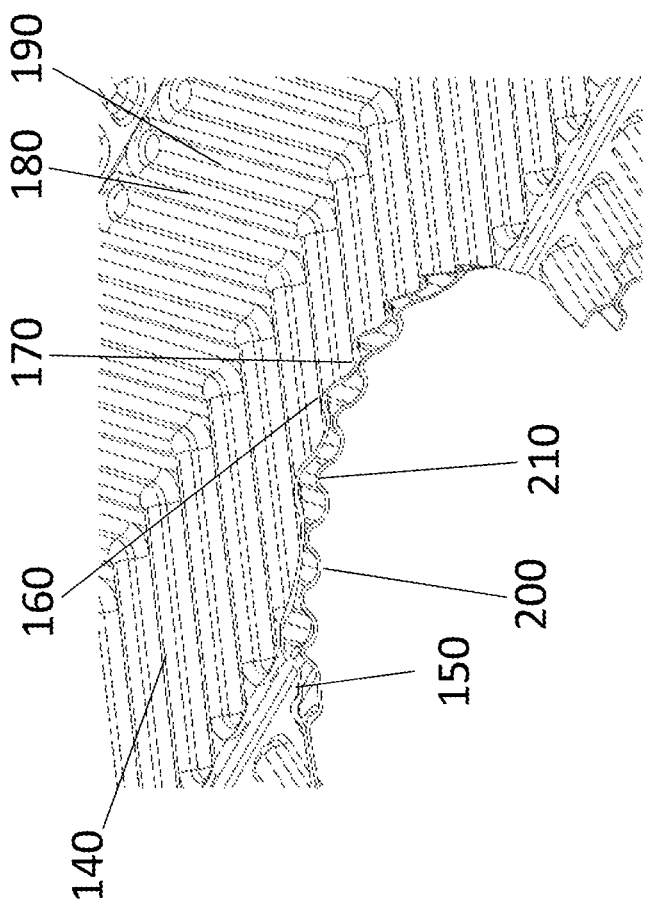
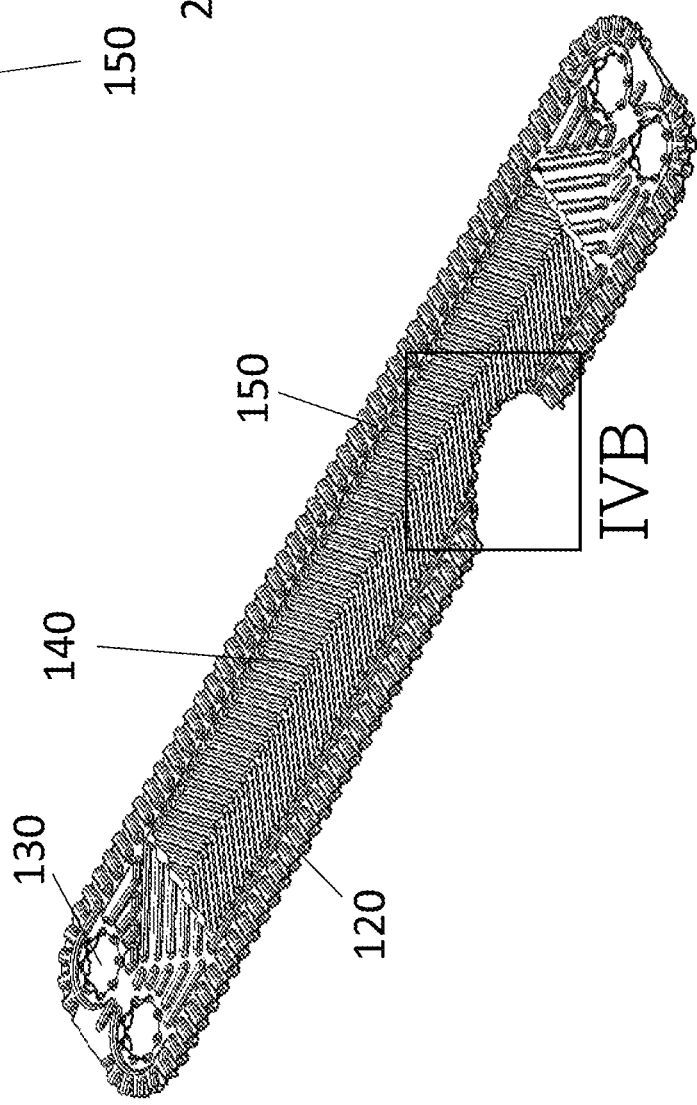
FIG. 4B
PRIOR ART
FIG. 4A
PRIOR ART

LEAK DETECTION FOR HEAT EXCHANGER PLATE

TECHNICAL FIELD

The present invention generally relates to a heat exchanger plate leak detection assembly and a method for leak detection of a heat exchanger plate.

BACKGROUND DISCUSSION

There are many different types of plate heat exchangers that are employed in various applications depending on the type and desired function. Generally, a plate heat exchanger is formed by assembling several heat exchanger plates (i.e., heat transfer plates) to each other to form a plate stack. A number of first heat exchanger plates (e.g., often referred to as "left plates" or "A plates") and a number of second heat exchanger plates (e.g., often referred to as "right plates" or "B plates") may be provided in the plate stack. The left and right heat exchanger plates may be gasketed to each other and arranged side by side in such a way that a first plate interspace is formed between each pair of adjacent left heat exchanger plates and right heat exchanger plates, and a second plate interspace between each pair of adjacent right heat exchanger plates and left heat exchanger plates. The first plate interspaces and the second plate interspaces are separated from each other and provided side by side in an alternating order in the plate package.

Each heat exchanger plate of a plate heat exchanger typically includes first plate portholes which may form a first inlet channel to the first plate interspaces, and second plate portholes which may form a first outlet channel from the first plate interspaces. The heat exchange surfaces of the heat exchanger plates may be corrugated (i.e., provided with corrugations). These corrugations may have many different forms, but generally the corrugations include elevated and depressed portions. The corrugations may define the width of the plate interspaces, create a turbulent flow in the plate interspaces and serve as a support for adjacent plates in the plate package. The plates are commonly manufactured from sheet metal, which is provided with the corrugations in one or more pressing operations. There are many different corrugation patterns used for heat exchange plates. One type of corrugation pattern comprises first ridges and grooves arranged in a first direction and second ridges and groove arranged in a second direction such that a V-shaped pattern resembling a herringbone pattern is formed at least in some portions of the plate. The heat exchanger plates each may include a gasket groove around a periphery of the plate for sealing the interior (e.g., around the corrugation pattern) of the heat exchanger plate.

SUMMARY

The design and accurate manufacture of the heat exchanger plates is important for providing efficient transfer of heat between the fluids. The heat exchanger plates must be durable and should be able to withstand various stresses that may occur, for example, due to pressure variations and temperature differences during operation. Importantly, each of the heat exchanger plates must be leak-tight (i.e., there are no cracks or pinholes in the heat exchanger plate) when manufactured. That is, when each of the heat exchanger plates is pressed to form the fluid distribution channels and/or heat transfer areas, it is vital that the resulting plate is leak-tight. A leak in any of the heat exchanger plates of a plate heat exchanger can deteriorate and/or ruin the performance of the plate heat exchanger.

During production of a plate heat exchanger, Non-Destructive Testing (NDT) may be performed to determine whether the plate is leak-tight. This NDT may be performed on a sample of heat exchanger plates or every heat exchanger plate may undergo NDT after being pressed. For example, production of stainless steel heat exchanger plates may involve performing NDT on the first twenty stainless steel plates produced. If these are acceptable, the remaining stainless steel heat exchanger plates from the same batch and run may not be tested. In another example, production of titanium heat exchanger plates may involve performing NDT on every heat exchange plate.

One common NDT method to determine whether a heat exchanger plate is leak-tight is known as a dye penetrant test. The dye penetrant test may involve, for example, the following steps. First, a newly manufactured heat exchanger plate is removed from the press and cleaned. A penetrant is then applied to one side of the cleaned heat exchanger plate. For example, the penetrant may be red in color and may be applied by spraying. The heat exchanger plate is then turned over, and a developer may be applied to the other side of the heat exchanger plate. The developer may include talcum powder, acetone and/or alcohol and may be white in color. The heat exchanger plate is then retained in a controlled environment for a predetermined period of time. After this time period has passed, the side of the heat exchanger plate with the developer (e.g., the side that is white) is visibly checked to determine the presence of the color of the penetrant. If the heat exchanger plate has a crack, crevice, pinhole or other related defect, the colored penetrant on the one side of the plate will seep through the crack, crevice, pinhole or other related defect and will color the white powder on the opposite side of the plate. On the other hand, if the heat exchanger plate is defect free, the powder on the opposite side of the heat exchanger plate will remain white. The heat exchanger plate is then cleaned to remove the substances that have been applied for the dye penetrant test. The plate is often then dried before being able to continue on the production path.

Dye penetrant NDT raises several concerns that may negatively impact production of heat exchanger plates. For example, dye penetrant testing requires a significant amount of equipment and supply of consumable substances (e.g., penetrant and developer) to perform the cleaning, spraying, staging and drying. Dye penetrant testing may also require a relatively long amount of time to remove the plate, transport the plate to a designated testing area, perform the testing (inclusive waiting the predetermined period of time before visual inspection), subsequent cleaning and drying of the plate, and then returning the plate to the production line. Dye penetrant testing also may require a designated area located a distance away from the plate press and may need to contain a dye spray booth to comply with federal, state, and/or local regulations. Floor space must also be allocated for the various steps, including staging one or more plates that have been sprayed and are in the predetermined time period before visual inspection (e.g., thirty minutes).

The heat exchanger plate leak detection assembly and leak detection method disclosed here utilize a leak detection concept quite different from the dye penetrant testing discussed above. The example of the non-destructive heat exchanger plate leak detection described here involves supplying an inert gas (e.g., helium) on one side of the heat exchanger plate and drawing a vacuum on the opposite side of the heat exchanger plate.

According to one aspect, a method is disclosed for detecting a leak in a heat exchanger plate that possesses oppositely facing first and second sides and that is usable in a plate package forming part of a heat exchanger that exchanges heat between plural fluids. The heat exchanger plate is usable in the plate package so that the first and second sides of the heat exchanger plate each face a respective heat exchanger of the plate package. The method includes positioning the heat exchanger plate on a first fixture that has a first gasket groove. The first gasket groove contains a first seal gasket extending in a closed loop within the first gasket groove. The positioning of the heat exchanger plate on the first fixture causes the first seal gasket to continuously directly contact the first side of the heat exchanger plate to create a first sealed space between the first fixture and the heat exchanger plate. The method includes positioning the heat exchanger plate on a second fixture comprising a second gasket groove that contains a second seal gasket extending in a closed loop within the second gasket groove. The positioning of the heat exchanger plate on the second fixture causes the second seal gasket to continuously directly contact the second side of the heat exchanger plate to create a second sealed space between the second fixture and the heat exchanger plate. The method includes supplying an inert gas into the second sealed space and drawing a vacuum in the first sealed space while the inert gas is within the first sealed space. The method includes detecting whether there is the inert gas in the first sealed space. The presence of the inert gas indicates that the plate is not leak tight. The method includes determining the plate is leak tight when the vacuum is maintained for a predetermined time and the inert gas is not detected in the first sealed space and determining that the method for detecting the leak must be repeated after replacing the first seal gasket with a new seal gasket when the vacuum cannot be maintained for the predetermined time.

Another aspect involves a method of detecting a leak in a heat exchanger plate. The heat exchanger plate possesses oppositely facing first and second sides and is usable in a plate package forming part of a heat exchanger that exchanges heat between plural fluids, so that the first and second sides of the heat exchanger plate each face a respective heat exchanger of the plate package. The method includes positioning the heat exchanger plate between a first fixture and a second fixture to create both a first sealed space between the heat exchanger plate and the first fixture that is sealed from the outside and a second sealed space between the heat exchanger plate and the second fixture that is sealed from the outside. The first sealed space is on the first side of the heat exchanger plate and the second sealed space is on the second side of the heat exchanger plate. The method includes supplying an inert gas to the first sealed space and drawing a vacuum in the second sealed space. The method includes detecting whether there is the inert gas in the second sealed space, presence of the inert gas indicating that the plate is not leak tight.

Another aspect involves a heat exchanger plate leak detection assembly for detecting a leak in a heat exchanger plate. The heat exchanger plate leak detection assembly includes a first fixture comprising a first gasket groove extending continuously to form a first closed loop and a second fixture comprising a second gasket groove extending continuously to form a second closed loop. A first seal gasket extends continuously within the first gasket groove in the first closed loop, and a second seal gasket extends continuously within the second gasket groove in the second closed loop. The first fixture is configured to form a first sealed space bounded by the heat exchanger plate, the first fixture and the first seal gasket. The second fixture is configured to form a second sealed space bounded by the heat exchanger plate, the second fixture and the first seal gasket. The heat exchanger plate leak detection assembly includes an inert gas source that communicates with the first sealed space via an injection port extending through the first fixture. The inert gas source is configured to deliver inert gas into the first sealed space. The heat exchanger plate leak detection assembly includes a vacuum pump configured to draw a vacuum in the second sealed space and an inert gas detector that communicates with the second sealed space to detect presence of the inert gas.

BRIEF DESCRIPTION OF THE DRAWINGS

FIG. 2A is a perspective view of a heat exchanger plate leak detection assembly taken along cross-section line IIA-IIA in FIG. 1 according to an embodiment of the present application. FIG. 2B is a cross-sectional view at area IIB of FIG. 2A showing a sealing location of the heat exchanger plate leak detection assembly according to an embodiment of the present application, and FIG. 2C is an enlarged cross-sectional view at area IIC of FIG. 2B of the sealing location according to an embodiment of the present application.

FIG. 4A is a perspective view of a heat exchanger plate with a portion removed for explanatory purposes, and FIG. 4B is a magnified view of the area identified as IVB in FIG. 4A.

DETAILED DESCRIPTION

Figure 1:
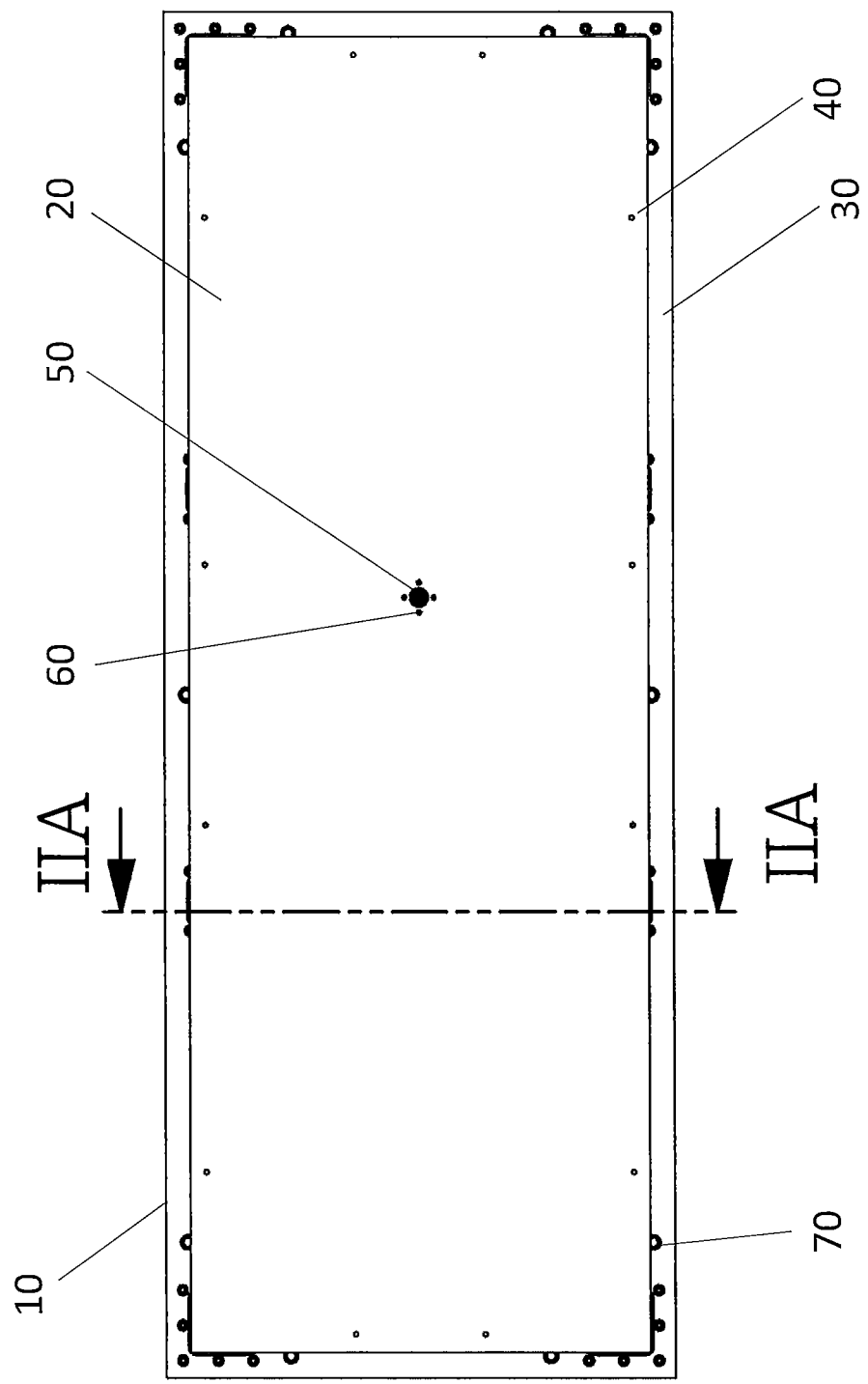
FIG. 1 is a top view of a heat exchanger plate leak detection assembly according to an embodiment of the present application.

Hereinafter, embodiments of a heat exchanger plate leak detection assembly and leak detection method representing examples of the inventive heat exchanger plate leak detection assembly and leak detection method disclosed here are described with reference to the accompanying drawing figures. The same reference numerals are given to common members in each drawing.

Generally speaking, the heat exchanger plate leak detection assembly disclosed here is comprised of two opposing fixtures (e.g., a lower fixture and an upper fixture), a vacuum seal, an inert gas seal, an inert gas supply, a vacuum pump, and an inert gas detector (e.g., a mass spectrometer). The inert gas may be, for example, helium, argon, nitrogen, neon, or mixes thereof. The inert gas detector is specifically selected to detect the specific inert gas supplied (e.g., a mass spectrometer configured to detect helium is selected when helium is supplied as the inert gas).

FIG. 1 generally depicts an elevation view of one embodiment of a leak detection assembly 10 representing an example of the heat exchanger plate leak detection assembly disclosed here. One embodiment of an upper fixture 20 can be seen in FIG. 1. The upper fixture 20 is positioned or provided directly on top of a lower fixture 30 during the leak detection testing of a heat exchanger plate 120 (which is depicted separate from the leak detection testing assembly in FIGS. 3-4B), such that the lower fixture 30 is largely obscured in FIG. 1. As can also be seen in FIG. 1, the lower fixture 30 may extend over a larger area than the upper fixture 20. However, the leak detection assembly 10 is not limited to the lower fixture 30 encompassing a larger area. The lower fixture 30 may extend over the same area as the upper fixture (i.e., the outer periphery of the two fixtures 20, 30 may be the same size) or may extend over a smaller area than the upper fixture 20. The upper fixture 20 and the lower fixture 30 are representative examples of two opposing fixtures, but the opposing fixtures are not limited to being upper and lower fixtures. For example, the two opposing fixtures may be oriented as a left fixture and a right fixture that have thicknesses in the lateral direction (instead of having a thickness in the vertical direction).

The upper fixture 20 may be connectable to an upper press table using fasteners (e.g., screws) through fastener holes 40. The lower fixture 30 may similarly be connected to a lower press table using fasteners (e.g., screws) through counter bore holes 70 (most clearly shown in FIG. 6). The upper and lower press tables are described in more detail below (e.g., in relation to FIGS. 9A and 9B). The fastener holes 40 and/or counter bore holes 70 may be, for example, threaded holes configured to receive a threaded screw or counter bore holes to house a fastener. The upper fixture 20 and/or lower fixture 30 may alternatively be connectable to the press tables using, for example, bolts, nuts, clamps, ties (e.g., cable ties), nuts, flanges, and pins. The connection between the upper fixture 20 and the lower fixture 30 and the respective press tables during the leak detection testing is not limited, however, to any specific fastening method or means. The press tables and the fixtures 20, 30 may alternatively be integrally formed at the same time so that the upper fixture 20 and upper press table and/or lower fixture 30 and lower press table are a unitary structure, respectively.

FIG. 1 also illustrates that the upper fixture 20 may include an injection port 50. The injection port 50 is a through-hole, channel, or port that extends through the upper fixture 20 (i.e., from the upper surface through the lower surface of the upper fixture) in a thickness direction of the upper fixture 20. The upper fixture 20 may include injection port connection holes 60 provided to connect, for example, an inert gas supply tube (described in more detail in relation to FIG. 9B below) to the injection port 50. For example, four injection port connection holes 60 may be provided adjacent to the injection port 50 so that an inert gas supply tube may be secured to the injection port 50. The injection port connection holes 60 may be, for example, threaded holes configured to receive a threaded screw or counter bore holes to house a fastener.

The injection port 50 is illustrated as being slightly off-center in the upper fixture 20 in FIG. 1. The position of the injection port 50 is not limited to this configuration, however, and the injection port 50 may be provided in another location in the upper fixture 20 (as long as the injection port 50 is inside of the second sealing gasket, discussed in more detail below). In some embodiments, the injection port 50 is provided at exactly the same position as a port (i.e., through-hole) in the upper press table so that an inert gas supply tube may pass through the upper press table to connect to the injection port connection holes 60 of the injection port 50. The injection port 50 may possess a circular cross-section as shown in FIG. 1 and may provide an orthogonal flow path through the upper fixture 20 (i.e., a flow path that is perpendicular to the plane of the surface of the upper fixture 20), but the injection port 50 is not limited in this respect. For example, the injection port 50 may possess a differently-shaped cross-section (e.g., rectangular) and/or may provide an angled flow path (i.e., non-perpendicular to the surface of the upper fixture 20) through the upper fixture 20. The use of the injection port 50 for inert gas delivery is discussed further below.

FIG. 2A illustrates a perspective view of the leak detection assembly 10 taken at cross section line IIA-IIA of FIG. 1. FIG. 2A shows that the upper fixture 20 is positioned above the heat exchanger plate 120 during the leak detection testing, and the lower fixture 30 is positioned below the heat exchanger plate 120 during the testing.

The lower fixture 30 includes a plurality of plate alignment block stripper bolts 80 which are each connected to a plate alignment block 90. The plate alignment block stripper bolts 80 provide a positive spring force that urges the plate alignment blocks 90 to extend beyond the upper surface of the main body of the lower fixture 30. As illustrated in FIG. 2B, the plate alignment block stripper bolts 80 may be spring-loaded to urge the plate alignment blocks 90 upwards when the lower fixture 30 is positioned below the heat exchanger plate 120 during leak detection testing. The plate alignment block stripper bolts 80 each include a guide bushing 100 that surrounds the respective plate alignment block stripper bolt 80 as shown in FIG. 2B. In some embodiments, the plate alignment block stripper bolts 80 may be springs (e.g., a coiled spring) that provide the urging force on each of the plate alignment blocks 90.

FIG. 2B illustrates that the plate alignment block 90 may include a recessed portion 110. The recessed portion 110 may be positioned towards the interior of the lower fixture 30, so that a step or cutout portion is formed in the plate alignment block 90 to receive an outer edge of the heat exchanger plate 120. The recessed portion 110 of each of the plate alignment blocks 90 is thus configured to receive the heat exchanger plate 120 to hold the heat exchanger plate 120 in the desired position (i.e., predetermined position relative to the lower fixture). The plate alignment blocks 90 may be provided in this manner at several locations around the periphery of the lower fixture 30 to hold the heat exchanger plate 120 in the desired position. For example, four plate alignment blocks 90 may be provided at the four corners of the heat exchanger plate 120. In another embodiment, such as that illustrated in FIGS. 2A and 2B, there may be additional plate alignment blocks 90 provided at various locations on the edge of the lower fixture 30 at locations between the corners of the lower fixture 30. In yet another embodiment, the plate alignment blocks 90 may extend along the entirety of the longitudinal and/or lateral sides of the lower fixture 30.

The plate alignment blocks 90 may be directly connected to the plate alignment block stripper bolts 80 as shown in FIG. 2B, so that a force acting on each of the plate alignment blocks 90 is transmitted to the alignment block stripper bolts 80. For example, when a heat exchanger plate 120 is positioned within the recessed portion 110 of each of the plate alignment blocks 90, the weight of the heat exchanger plate 120 applies a (relatively small) downward force on the alignment block stripper bolts 80. The alignment plate alignment blocks 90 may hold the heat exchanger plate 120 so that the heat exchanger plate 120 is positioned beyond (e.g., above) the main body of the lower fixture 30 until the upper fixture 20 is moved relative to (e.g., pressed downwards onto) the lower fixture 30 for sealing the heat exchanger plate 120. The plate alignment blocks 90 thus may help the operator load and offload the heat exchanger plates 120. When the upper fixture 20 is moved relative to the lower fixture 30 to seal the heat exchanger plate 120 (as further described below), the lower surface of the upper fixture 20 may directly contact the top surface of the plate alignment blocks 90 to press the plate alignment blocks 90 away from the upper fixture 20 (e.g., downwards) against the biasing force applied by the alignment block stripper bolts 80.

The heat exchanger plate 120 may thus be removed from the recessed portion 110 of the plate alignment blocks 90 when the upper and lower fixtures 20, 30 seal the heat exchanger plate 120. In other words, the plate alignment blocks 90 may move relative to the heat exchanger plate 120 so that the lower surface of the heat exchanger plate 120 is no longer positioned on the recessed portion 110 of the plate alignment blocks 90 when the upper fixture 20 is moved relative to the lower fixture 30 to seal the heat exchanger plate 120. Additional details of the alignment block stripper bolts 80 and the plate alignment blocks 90 are discussed below in relation to FIGS. 6-8.

As shown in FIGS. 2A-2C, the lower fixture 30 is positioned opposite (i.e., in opposing relation to) the upper fixture 20 when the lower fixture 30 and upper fixture 20 are in sealed contact or engagement with the heat exchanger plate 120 for leak detection testing. The main body of the lower fixture 30 and the main body of the upper fixture 20 each may be rectangular, with two longer longitudinal edges and two shorter lateral edges to accommodate the heat exchanger plate 120. The shape of the lower fixture 30 and/or the upper fixture 20 is not limited to any particular shape, however, and may be selected based on the shape of the heat exchanger plate 120 to be tested. The shape of the upper fixture 20 and the lower fixture 30 may match the shape of the heat exchanger plate 120.

FIG. 2C shows a magnified cross-sectional view of the location IIC of FIG. 2B. In FIG. 2C, a heat exchanger plate 120 is sealed between the upper fixture 20 and the lower fixture 30. Before explaining the sealing details of FIG. 2C, the heat exchanger plate 120 is first described to facilitate an understanding of the general configuration of a heat exchanger plate 120 that is sealed and leak tested.

Figure 3:
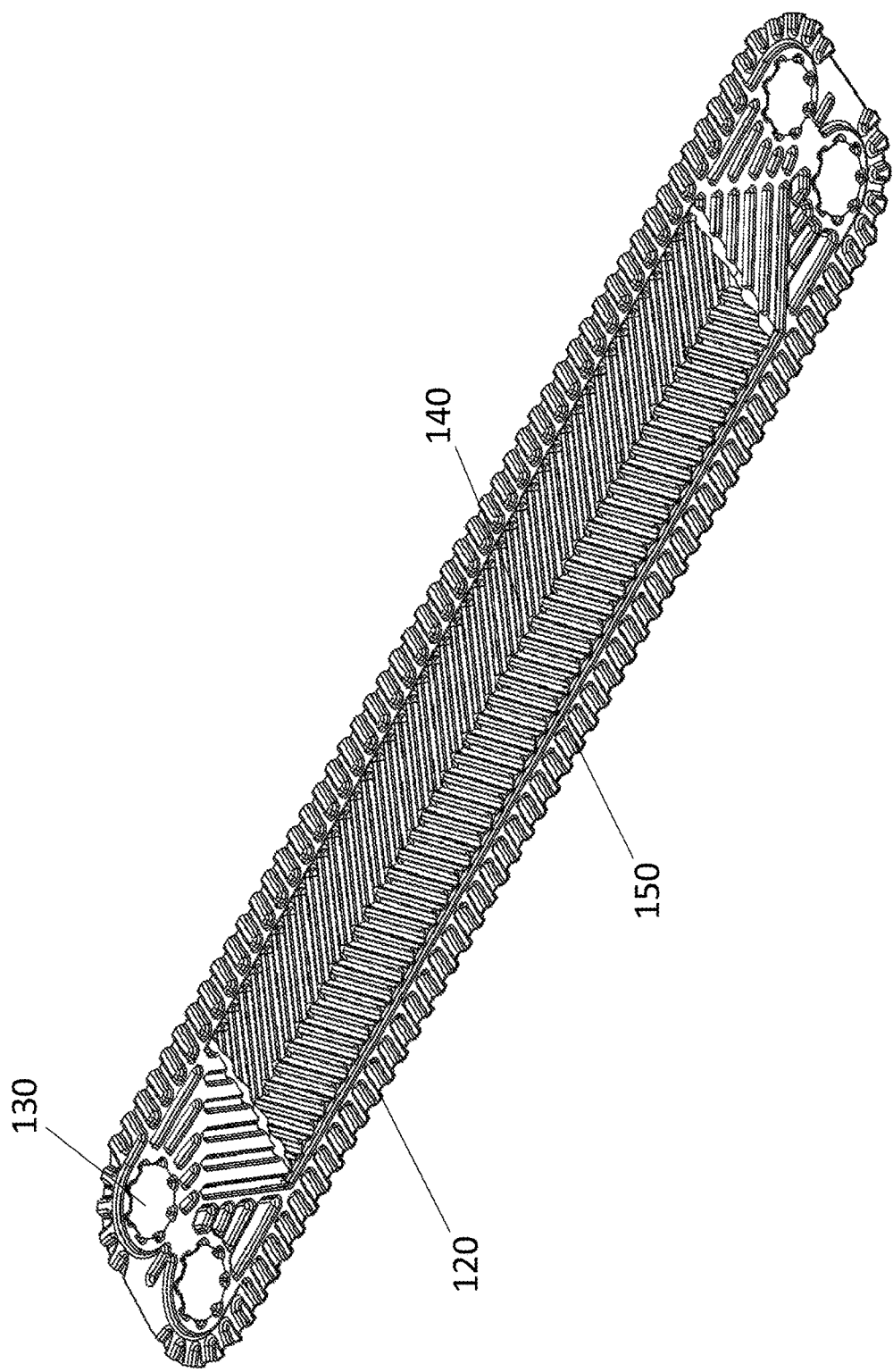
FIG. 3 is a perspective view of a heat exchanger plate according to an embodiment.

FIG. 3 depicts one embodiment of the heat exchanger plate 120. The heat exchanger plate 120 may be generally rectangular shaped as shown in FIG. 3, with two longer longitudinal edges and two shorter lateral edges. The corners of the rectangular heat exchanger plate 120 may be rounded (i.e., arced or curved) as shown in FIG. 3. The heat exchanger plate 120 may include at least one plate porthole 130. The embodiment of FIG. 3 includes four plate portholes 130. Each plate porthole 130 is a through-hole extending fully through the heat exchanger plate 120 in the thickness direction of the heat exchanger plate 120. The plate portholes 130 may be provided adjacent to (i.e., relatively close to or spaced a small distance away from) the four rounded corners of the heat exchanger plate 120. The plate portholes 130 may include some portholes that form at least one inlet channel to the plate interspaces of the plate heat exchanger, and other portholes that form at least one outlet channel from the plate interspaces. The plate portholes 130 may be circular as shown in FIG. 3 or may be any other suitable shape for serving as the inlet and/or outlet channels (e.g., ovular).

While FIG. 3 illustrates the heat exchanger plate 120 as having plate portholes 130, the plate leak detection testing may be performed before the plate portholes 130 are formed through the heat exchanger plate 120. That is, the plate heat exchanger 120 may be leak detection tested before the plate portholes 130 are provided through the heat exchanger plate 120. The sealing configuration during the leak detection testing may be modified based on whether or not the plate portholes 130 have been removed.

The heat exchange surfaces (i.e., the top surface and/or the bottom surface) of the heat exchange plate 120 may be provided with a corrugation pattern 140 as depicted in FIG. 3. The heat exchanger plate 120 also may include a gasket groove 150 that surrounds the corrugation pattern 140. The gasket groove 150 receives a gasket seal (that produces a seal when pushed against the adjacent plate) when a plurality of heat exchanger plates 120 are assembled (e.g., gasketed) to form plate heat exchanger. The gasket groove 150 thus may hold a gasket that seals the corrugation pattern 140 towards the interior of the heat exchanger plate 120 from the plate portholes 130.

FIG. 4A shows a pair of heat exchanger plates 120 with a cutaway section identified as IVB to more clearly depict the corrugation pattern 140 and to show how an A plate and a B plate look when joined to one another. FIG. 4B provides an enlarged view of the cutaway section IVB. As shown in FIGS. 4A and 4B, the corrugation pattern 140 may include elevated and depressed portions in the thickness direction of the heat exchanger plate 120. As mentioned in the background discussion section above, the corrugation pattern 140 may define the width of the plate interspaces, create a turbulent flow in the plate interspaces and serve as a support for adjacent heat exchanger plates 120 in the plate heat exchanger. The corrugation pattern 140 may be pressed into the heat exchanger plate 120 by performing one or more pressing operations on the heat exchanger plate 120 (e.g., in a plate press). FIGS. 3-4B illustrate one type of corrugation pattern 140 (e.g., an A plate) with first ridges 160 and first grooves 170 arranged in a first direction and second ridges 180 and second grooves 190 arranged in a second direction such that a V-shaped pattern resembling a herringbone pattern is formed. There are many different corrugation patterns 140 used for heat exchange plates, however, and FIGS. 3-4B simply shows an example of a typical corrugation pattern 140.

FIG. 4B illustrates that the opposite surface (e.g., a B plate) of the heat exchanger plate 120 may also include a corrugation pattern 140 with ridges 200 and grooves 210. FIG. 4B also shows that the gasket groove 150 extends outside of (i.e., beyond) the outer periphery of the corrugation pattern 140. The plate portholes 130 may be positioned outside of (i.e., beyond) the corrugation pattern 140, such that there is no overlap between the corrugation pattern 140 and the plate portholes 130 as shown in FIGS. 3 and 4A.

Figure 5:
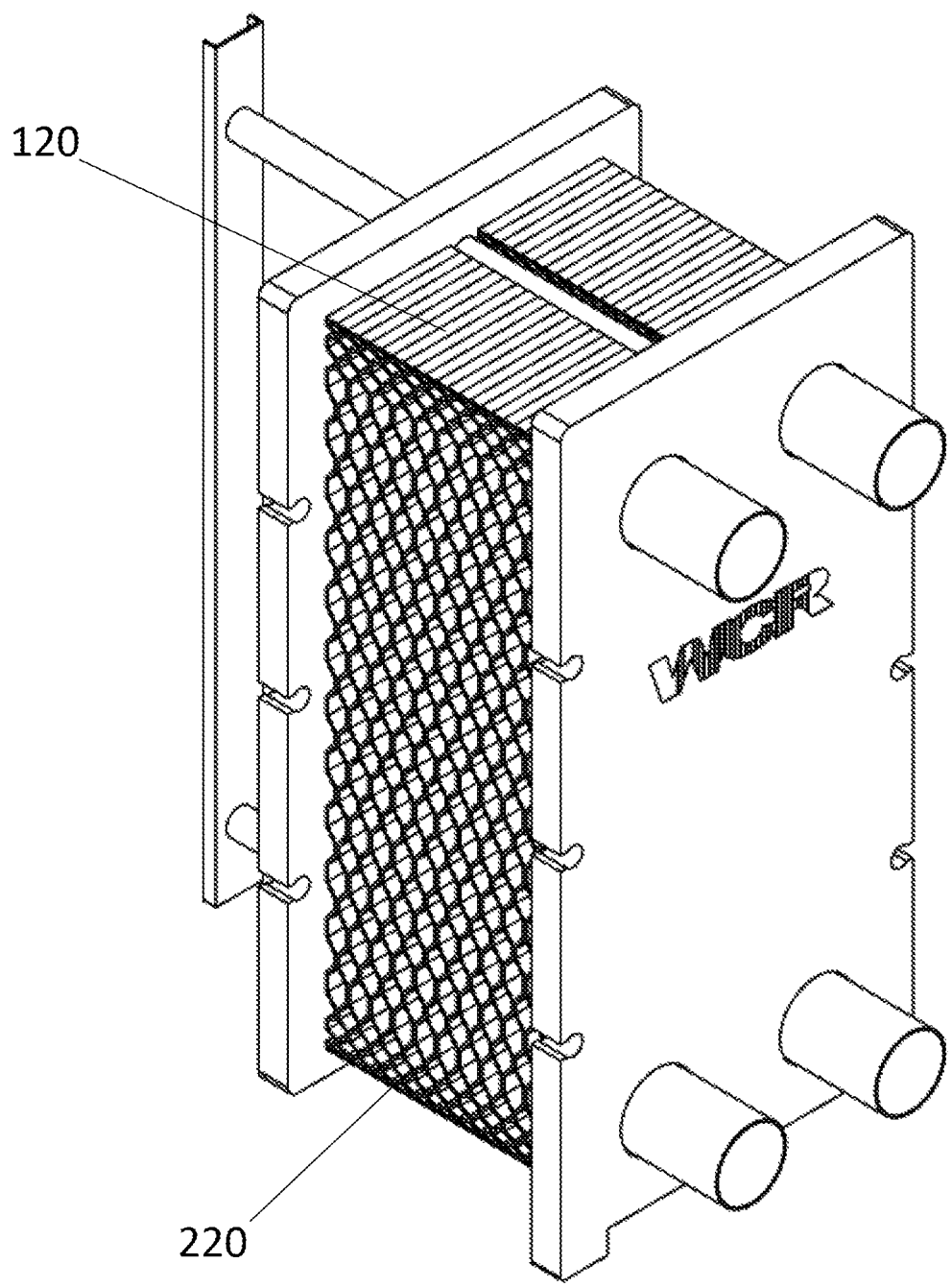
FIG. 5 is a perspective view showing a plate heat exchanger according to an embodiment.

A plurality of the heat exchanger plates 120 may be assembled (e.g., gasketed and joined together) in a plate stack 220 as shown in FIG. 5. Adjacent heat exchanger plates 120 in the plate stack 220 may possess oppositely oriented patterns (e.g., a heat exchanger plate 120 with the corrugation pattern 140 shown in FIGS. 3-4B may be positioned between two heat exchanger plates 120 with a corrugation pattern 140 with first ridges 160, first grooves 170, second ridges 180 and second grooves 190 oriented in an inverted V-shaped pattern relative to the heat exchanger plate 120). More specifically, a plate with one configuration (e.g., a left plate or plate "A") may alternate with a plate with the different configuration (e.g., a right plate or plate "B") in the plate stack 220. The plate interspaces discussed above are provided between each of the adjacent heat exchanger plates 120 in the thickness direction of the plate stack 220 (i.e., the left-right direction of FIG. 4).

FIGS. 2A-2C show one heat exchanger plate 120 (which could be used, for example, in the plate stack 220 of FIG. 5) being sealed between the upper fixture 20 and the lower fixture 30. This sealing allows, for example, the leak detection testing to be performed. FIG. 2C depicts that the main body of the lower fixture 30 may include an upwardly projecting gasket holder 230. The upwardly projecting gasket holder 230 may protrude (i.e., extend) upwardly from the upper surface of the main body of the lower fixture 30, so that the upwardly projecting gasket holder 230 extends upwardly beyond the upper surface of the main body of the lower fixture 30 as shown in FIG. 2C.

The upwardly projecting gasket holder 230 may be integral with and formed in one piece with the lower fixture 30, so that the upwardly projecting gasket holder 230 and the lower fixture 30 are a unitary structure. The shape of the outer surface of the upwardly projecting gasket holder 230 may be configured to fit within the gasket groove 150 of the heat exchanger plate 120 that is to be leak detection tested. That is, the upwardly projecting gasket holder 230 may possess an outer geometry that matches the contour of the gasket groove 150 of the heat exchanger plate 120 as shown in FIG. 2C. The upwardly projecting gasket holder 230 may also thus be provided on the lower fixture 30 at a location that corresponds to the gasket groove 150 of the heat exchanger plate 120 desired to be tested. The upwardly projecting gasket holder 230 may be configured in this particular manner (e.g., with an outer geometry that is shaped to match/fit within the gasket groove 150) to help ensure proper heat exchanger plate 120 alignment during leak detection testing. By placing the upwardly projecting gasket holder 230 in the gasket groove 150 of the heat exchanger plate 120, the leak detection testing can be conducted over the entirety of the heat exchanger plate 120 inside of (i.e., interior to) the gasket groove 150. It is this interior area of the heat exchanger plate 120 (i.e., including the corrugation pattern 140 discussed above) that must be leak-tight when the heat exchanger plate 120 is used, for example, as part of the plate stack 220 of FIG. 5.

FIG. 2C depicts that the upwardly projecting gasket holder 230 includes a groove that receives (i.e., contain or house) a first sealing gasket 240 (e.g., a vacuum sealing gasket). The first sealing gasket 240 may thus be positioned in (i.e., installed in) the groove (a first gasket groove) of the upwardly projecting gasket holder 230 to provide a seal between the lower fixture 30 and the surface of the heat exchanger plate 120 (i.e., the lower surface when the heat exchanger plate 120 is installed as shown in FIG. 2C and the lower fixture 30 is oriented underneath the heat exchanger plate 120) when performing the heat exchanger plate leak detection.

As shown in FIGS. 2B and 2C, the upwardly projecting gasket holder 230 may possess two supporting extension portions 250 that are spaced apart from one another to define the groove between the two supporting extension portions 250. The two supporting extension portions 250 may possess a flat (i.e., planar) inner surface that is perpendicular to the recessed portion of the groove (i.e., the side surfaces of the groove) and a curved outer surface, but the inner and outer surfaces of each of the two supporting extension portions 250 are not limited to any particular configuration. The upwardly projecting gasket holder 230 thus has an open top at one end (i.e., the groove opening) and a recessed surface (i.e., the bottom surface of the groove) at the opposite end. The groove of the upwardly projecting gasket holder 230 may possess a rectangular cross-section as shown in FIGS. 2B and 2C. However, the groove of the lower fixture 30 that receives the first sealing gasket 240 is not limited to protruding from the main body of the lower fixture 30 in this manner or being shaped in any particular way. As discussed above, however, there are plate alignment benefits if an upwardly projecting gasket holder 230 is used that has an outer geometry that fits within the gasket groove 150 of the heat exchanger plate.

Figure 8:
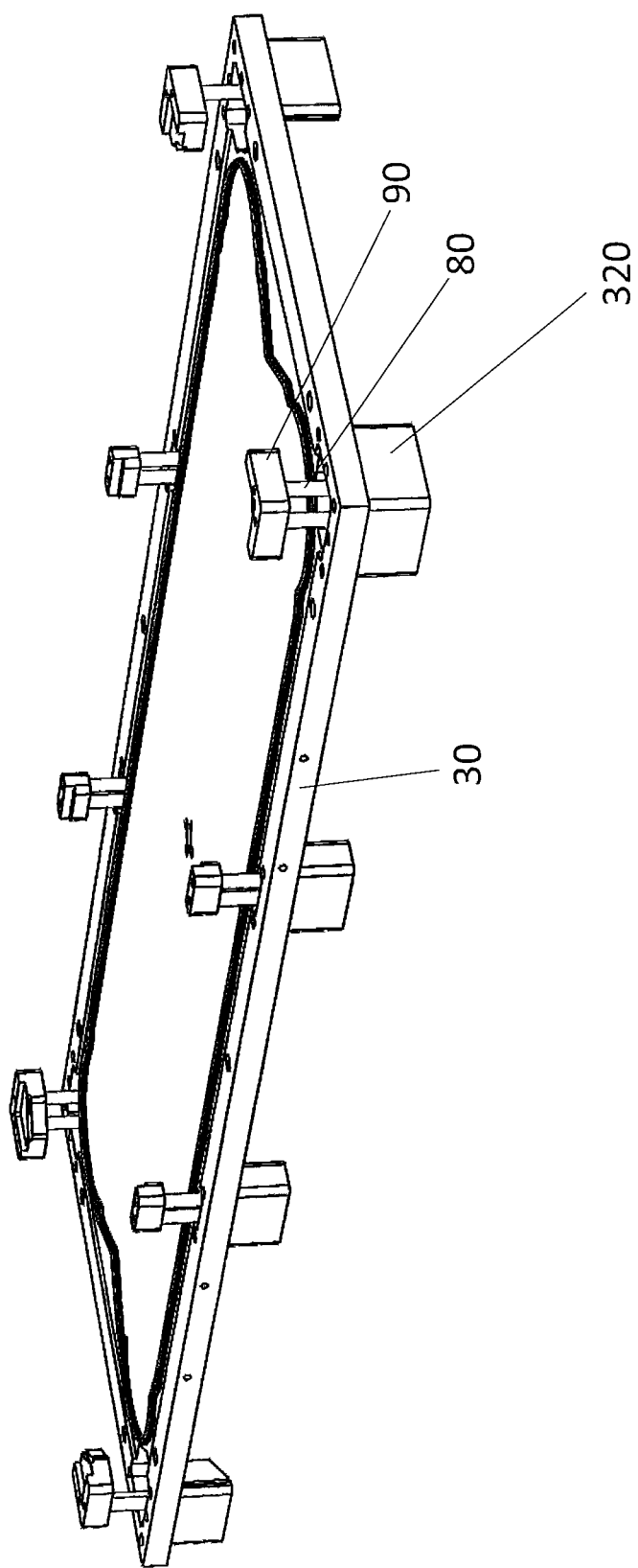
FIG. 8 is a perspective view showing the lower fixture of a heat exchanger plate leak detection assembly at a downward angle according to an embodiment of the present application.

The first sealing gasket 240 may extend continuously in the groove of the upwardly projecting gasket holder 230 (e.g., as illustrated in FIG. 8 and discussed further below). The first sealing gasket 240 may extend beyond the open top end of the upwardly projecting gasket holder 230 in the thickness direction of the lower fixture 30, so that the first sealing gasket 240 is configured to directly contact the surface of the heat exchanger plate 120 (e.g., the lower surface) when the heat exchanger plate 120 is positioned on the lower fixture 30. In other words, the first sealing gasket 240 extends continuously around the entire periphery of the lower fixture 30 in an uninterrupted manner so that when the first sealing gasket 240 engages with or directly contacts the heat exchanger plate 120, a continuous seal is created. The seal (and thus a sealed space, discussed below) may thus be created between the first sealing gasket 240 and the surface of the heat exchanger plate 120 (i.e., a sealed space bounded by the first sealing gasket 240, the surface of the heat exchanger plate 120 and the lower fixture 30).

FIGS. 2B and 2C also illustrate that the main body of the upper fixture 20 includes an upper fixture gasket groove 260 (e.g., a second gasket groove). The upper fixture gasket groove 260 is configured to receive (i.e., house or contain) a second sealing gasket 270 (e.g., an inert gas sealing gasket). The upper fixture gasket groove 260 may be a channel within the upper fixture 20 as shown in FIGS. 2B and 2C (i.e., the upper fixture gasket groove 260 may not protrude downward beyond the lower surface of the main body of the upper fixture 20 in the manner of the upwardly projecting gasket holder 230). The configuration of the upper fixture gasket groove 260 is not limited to any particular configuration, however, and a lower fixture gasket groove may instead be provided on the lower fixture 30 with a downwardly projecting gasket holder provided on the upper fixture 20. In addition, projecting gasket holders may be used on both the upper and lower fixtures 20, 30.

The upper fixture gasket groove 260 may possess a recessed end (i.e., the top end of the upper fixture gasket groove 260 of FIG. 2C) with a rectangular cross-section and an open end (i.e., the bottom end of the upper fixture gasket groove 260 of FIG. 2C) as shown in FIG. 2C. The upper fixture gasket groove 260 may thus be configured to receive the second sealing gasket 270, so that the second sealing gasket 270 protrudes downwardly beyond the open end of the upper fixture gasket groove 260.

The upper fixture 20 and the lower fixture 30 may be manufactured from aluminum. The material is not limited to aluminum, however, and may be any suitable material, such as another metal, metal alloy, ceramic, polymer, etc. The upper fixture 20 and the lower fixture 30 may be different materials from one another or may be the same material.

The first sealing gasket 240 and the second sealing gasket 270 may be any material that is suitable to form a gas-tight (fluid-tight) seal against the heat exchanger plate 120. For example, the first sealing gasket 240 and the second sealing gasket 270 may be a polymer, such as nitrile or polyurethane. The first sealing gasket 240 and/or the second sealing gasket 270 may also be ethylene propylene diene monomer (EPDM) rubber, silicone, hydrogenated nitrile butadiene rubber (HNBR), fluoroelastomer (FKM), butyl rubber, chloroprene (CR), etc. The material of the first and second sealing gaskets 240, 270 is preferably compressible to seal (i.e., form a sealed space closed to the external environment) between the heat exchanger plate 120 and the lower fixture 30 and between the heat exchanger plate 120 and the upper fixture 20, respectively. The first and/or second sealing gaskets 240, 270 may be cut from a longer spool of gasket material (e.g., nitrile) and then the ends of the cut length of gasket material may be cold-spliced together (or joined in any other manner) to form a continuous, closed loop gasket.

The first sealing gasket 240 and the second sealing gasket 270 may possess a cross-section that has the same shape as the cross-section of the groove of the upwardly projecting gasket holder 230 and the cross-section of the upper fixture gasket groove 260, respectively. For example, one end of the first and/or second sealing gaskets 240, 270 may be rectangular in shape to match the cross-sectional profile of the groove of the upwardly projecting gasket holder 230 and the cross-section of the upper fixture gasket groove 260 (e.g., as shown in FIGS. 2B and 2C). Additionally, the end of the first sealing gasket 240 that protrudes beyond the upwardly projecting gasket holder 230 and/or the end of the second sealing gasket 270 that protrudes downwardly beyond the upper fixture gasket groove 260 may be rounded (e.g., semi-circular). The rounded end of the first and/or second sealing gasket 240, 270 may contact the surface of the heat exchanger plate 120 at an apex of the rounded end, so that the contact area between the rounded end of the first and/or second sealing gasket 240, 270 and the surface of the heat exchanger plate 120 is minimized. The contact point between the heat exchanger plate 120 and the respective sealing gasket 240, 270 may be more likely to be continuous over the entirety of the sealing gasket 240, 270 if the contacting end of the sealing gasket 240, 270 is rounded to possess an apex in this manner. The rounded end of the sealing gasket 240, 270 may increase the pressure between the sealing gasket 240, 270 and the heat exchanger plate 120 because the pressing force is divided over the sealing area (i.e., by making the contact area relatively small, the local pressure increases to form a relatively stronger seal).

In another embodiment, the first and/or second sealing gaskets 240, 270 may possess a circular or ovular cross-section in an unstressed state (i.e., with no external force applied). In this case, when an external compression force is applied to form a sealed space, the portion of the first and/or second sealing gasket 240, 270 that extends into the groove of the upwardly projecting gasket holder 230 and/or upper fixture gasket groove 260 (i.e., the end of the first and second sealing gasket 240, 270 opposite from the heat exchanger plate in the thickness direction) may deform in accordance with the shape of the groove of the upwardly projecting gasket holder 230 and/or the upper fixture gasket groove 260, respectively. For example, the ends of the first and/or second sealing gaskets 240, 270 that are in the groove of the upwardly projecting gasket holder 230 and/or upper fixture gasket groove 260 may deform to possess a rectangular shape as shown in FIG. 2C.

The enlarged view of FIG. 2C depicts that a first sealed space 280 and a second sealed space 290 are created when the heat exchanger plate 120 is positioned on the lower fixture 30, and the fixtures 20, 30 are moved relative to one another (i.e., one fixture 20, 30 is moved or both fixtures 20, 30 are moved relative to one another) to bring the first and second sealing gaskets 240, 270 into contact with the opposite surfaces of the heat exchanger plate 120. That is, the direct contact between the first sealing gasket 240 and the lower surface of the heat exchanger plate 120 creates the first sealed space 280 that is completely sealed from the outside (i.e., from the outer environment). The first sealed space 280 is a sealed (i.e., closed) volume bounded by the lower surface of the heat exchanger plate 120, the lower fixture 30 and the first sealing gasket 240.

The second sealed space 290 is a sealed (i.e., closed) volume bounded by the upper fixture 20, the second sealing gasket 270 and the upper surface of the heat exchanger plate 120 as shown in FIG. 2C. The first sealed space 280 and the second sealed space 290 are thereby sealed from the atmosphere (i.e., the external environment that exists on the outside of the sealed spaces 280, 290). In FIG. 2C, the space between the upper and lower fixtures 20, 30 and to the right of the first and second sealing gaskets 240, 270 represents the atmosphere.

Figure 6:
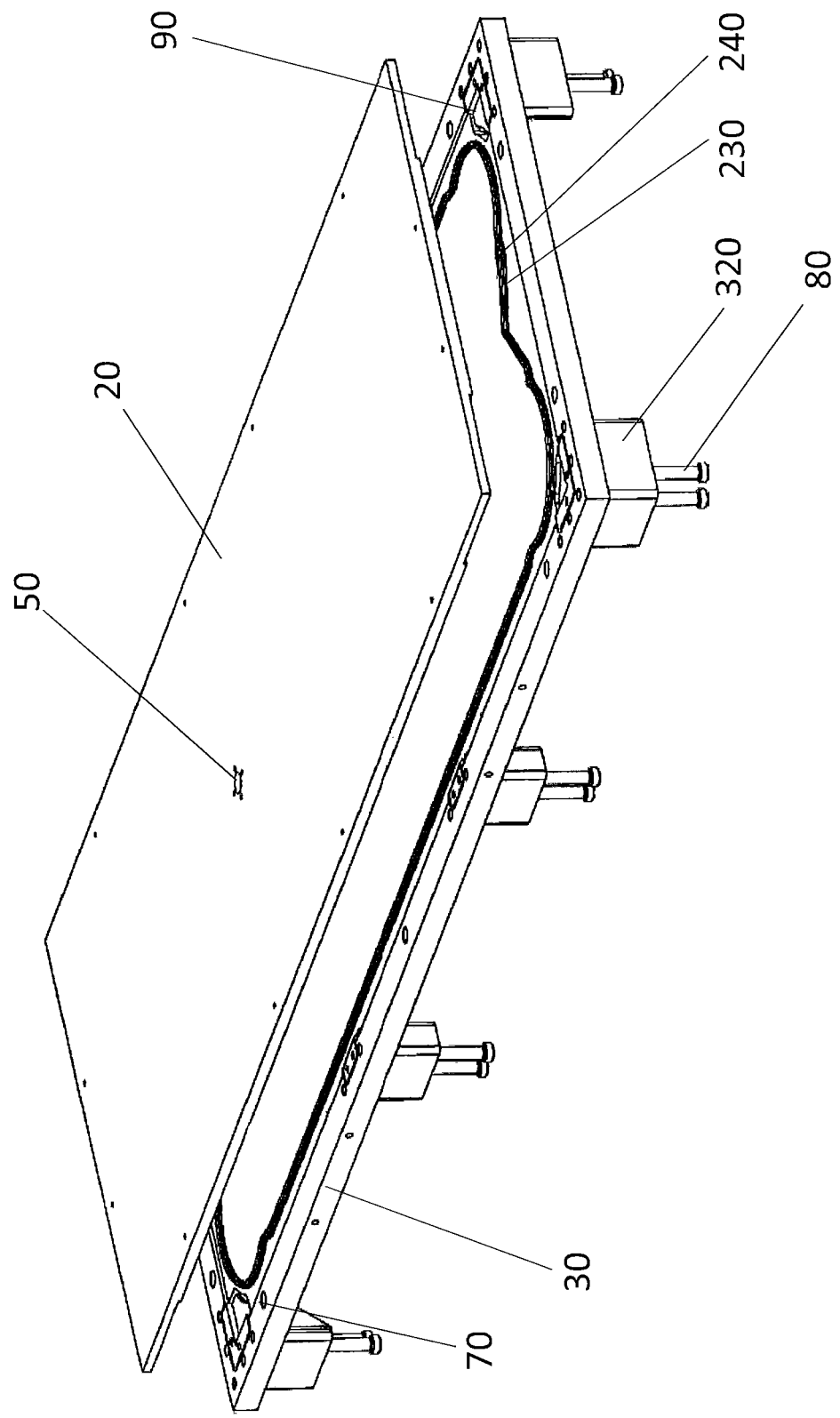
FIG. 6 is a perspective view showing a heat exchanger plate leak detection assembly at a downward angle according to an embodiment of the present application.

FIG. 6 shows the lower fixture 30 as if the upper fixture 20 were pressed down on the lower fixture 30. The upper fixture 20 is depicted above the lower fixture 30 in FIG. 6 for illustrative purposes so that the configuration of the upwardly projecting gasket holder 230 and the first sealing gasket 240 can be seen. In this embodiment, the upwardly projecting gasket holder 230 and the first sealing gasket 240 are shown in a configuration designed for leak detection testing a heat exchanger plate 120 that does not have plate portholes 130. In another embodiment, however, the upwardly projecting gasket holder 230 and the first sealing gasket 240 may form a closed loop that passes within the interior of the plate portholes 130. The first sealing gasket 240 in the groove of the upwardly projecting gasket holder 230 may extend in a continuous manner as a closed loop (i.e., the upwardly projecting gasket holder 230 may form a closed channel or path that does not possess an open end and the first sealing gasket 240 may extend in this closed loop) along the main body of the lower fixture 30.

The upwardly projecting gasket holder 230 and the first sealing gasket 240 may be positioned slightly inwardly from the outer periphery of the lower fixture 30 as shown in FIG. 6. More specifically, the upwardly projecting gasket holder 230 may be specifically designed to correspond to a specific heat exchanger plate 120. The size, shape and configuration of the upwardly projecting gasket holder 230 may thus be determined (i.e., selected) based on the size, shape and configuration of the heat exchanger plate 120. As noted above, the upwardly projecting gasket holder 230 may be located on the lower fixture 30 to avoid overlapping with the plate portholes 130 of the heat exchanger plate 120 when the heat exchanger plate 120 includes plate portholes 130 (i.e., the upwardly projecting gasket holder 230 may have a curved portion that passes inside of the edge of the plate portholes 130).

The upwardly projecting gasket holder 230 may thus have two longitudinal edges that extend along the longitudinal sides of the heat exchanger plate during sealing and may possess several (e.g., four) curved (e.g., semi-circular) portions at the corners and/or lateral sides of the heat exchanger plate that are interior to the plate portholes 130 of the heat exchanger plate 120. The entirety of the upwardly projecting gasket holder 230 and the first sealing gasket 240 may also be seen in FIG. 8.

Figure 7:
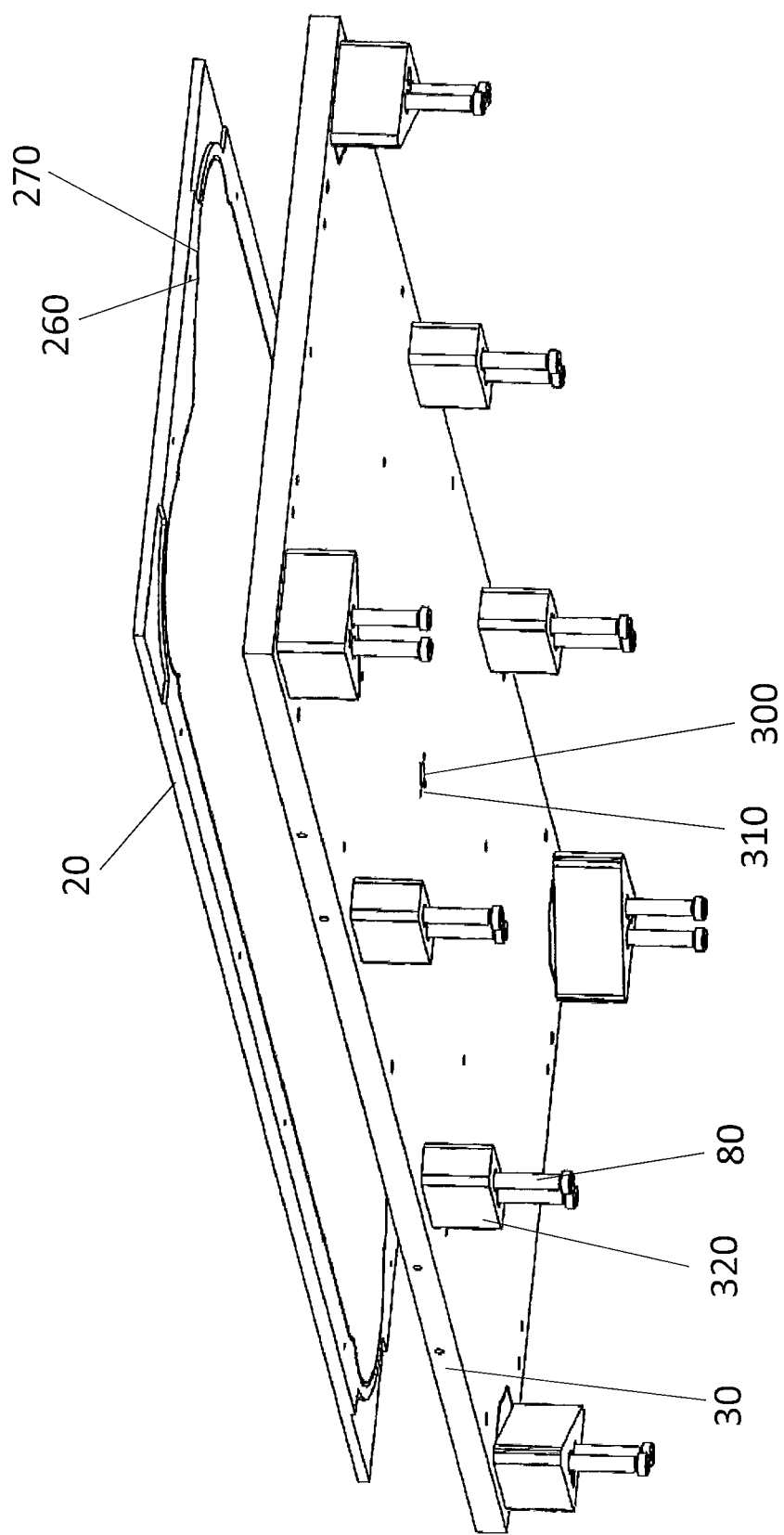
FIG. 7 is a perspective view showing a heat exchanger plate leak detection assembly at an upward angle according to an embodiment of the present application.

FIG. 7 shows the embodiment of FIG. 6, except that the viewpoint is at an upward angle to the leak detection assembly 10. FIG. 7 illustrates that the upper fixture gasket groove 260 (and thus the second sealing gasket 270 within the upper fixture gasket groove 260) may be specifically designed to correspond to a specific heat exchanger plate 120, similar to the configuration of the upwardly projecting gasket holder 230 described above. In other words, the size, shape and configuration of the upper fixture gasket groove 260 may be set based on the size, shape and configuration of the heat exchanger plate 120. The upper fixture gasket groove 260 may extend continuously as a closed loop and may provide a sealing pattern similar to the sealing pattern described above regarding the upwardly projecting gasket holder 230 (and so repetition here is not warranted). The upper fixture gasket groove 260 may possess an identical sealing pattern as the upwardly projecting gasket holder 230. The upper fixture gasket groove 260 may also possess a different sealing pattern from the upwardly projecting gasket holder 230.

The second sealing gasket 270 positioned within (i.e., installed in) the upper fixture gasket groove 260. The second sealing gasket 270 may extend continuously within the upper fixture gasket groove 260 (and thus the second sealing gasket 270 may also form a closed loop). As shown in FIGS. 2C and 7, the second sealing gasket 270 may extend downwardly beyond the open end (i.e., the lower end) of the upper fixture gasket groove 260 so that the second sealing gasket 270 is configured to directly contact the surface (upper surface) of the heat exchanger plate 120 when the heat exchanger plate 120 is engaging with the upper fixture 20. In other words, the second sealing gasket 270 extends continuously around the entire periphery of the upper fixture 20 in an uninterrupted manner so that when the second sealing gasket 270 engages with or directly contacts the heat exchanger plate 120, a continuous seal is created. The second sealed space 290 may thus be created between the second sealing gasket 270 and the surface of the heat exchanger plate 120 (i.e., a sealed space bounded by the second sealing gasket 270, the surface of the heat exchanger plate 120 and the upper fixture 20).

FIG. 7 depicts that the lower fixture 30 includes a suction port 300. The suction port 300 is a through-hole, channel or port that extends through the lower fixture 30 (i.e., from the upper surface through the lower surface of the upper fixture) in a thickness direction of the lower fixture 30. The lower fixture 30 may include suction port connection holes 310 provided to connect, for example, a vacuum connection tube (described in more detail in relation to FIG. 9B below) to the suction port 300. For example, four suction port connection holes 310 may be provided adjacent to the suction port 300 so that a vacuum connection tube may be secured to the suction port 300. The suction port connection holes 310 may be, for example, threaded holes configured to receive a threaded screw or counter bore holes to house a threaded screw attaching to the vacuum connection.

The suction port 300 is illustrated as being at the center of the lower fixture 30 in FIG. 7. The position of the suction port 300 is not limited to this configuration, however, and the suction port 300 may be provided in another location in the lower fixture 30 inside of the first sealing gasket 240. In some embodiments, the suction port 300 is provided at exactly the same position as a port (i.e., through-hole) in the lower press table so that a vacuum connection tube may pass through the lower press table to connect to the suction port connection holes 310 of the suction port 300. The suction port 300 may possess a circular cross-section as shown in FIG. 7 and may provide an orthogonal flow path through the lower fixture 30 (i.e., a flow path that is perpendicular to the plane of the surface of the lower fixture 30), but the suction port 300 is not limited in this respect. For example, the suction port 300 may possess a differently-shaped cross-section (e.g., rectangular) and/or may provide an angled flow path (i.e., non-perpendicular to the surface of the lower fixture 30) through the lower fixture 30. The use of the suction port 300 to draw a vacuum in the first sealed space 280 is discussed further below in relation to FIG. 9B.

As illustrated in FIGS. 6-8, the lower fixture 30 may include lower fixture alignment blocks 320. The lower fixture alignment blocks 320 are connected to the lower surface of the lower fixture 30 and are provided so that the lower fixture 320 may be inserted into corresponding holes of a lower press table (described further below). In some embodiments, there may be four lower fixture alignment blocks 320 provided at the four corners of the lower fixture 30. In other embodiments, such as the embodiment depicted in FIGS. 6-8, there may be additional lower fixture alignment blocks 320 provided along the lateral and/or longitudinal edges of the lower fixture 30.

The lower fixture alignment blocks 320 are provided on the lower fixture 30 so that the lower fixture 30 is insertable into and removable from the lower press table. The lower press table may include a plurality of different holes (and thus hole configurations) so that differently sized lower fixtures 30 may be inserted into the lower press table. The plate alignment block stripper bolts 80 may each extend through the interior of the lower fixture alignment blocks 320 as shown in FIGS. 2A and 6-8. The plate alignment block stripper bolts 80 are movable relative to the lower fixture alignment blocks 320. For example, FIG. 6 depicts the plate alignment block stripper bolts 80 and the plate alignment blocks 90 being pressed down (e.g., representing the situation when the upper fixture 20 applies a downward sealing force on the heat exchanger plate 120 and thus pushes the plate alignment block stripper bolts 80 and the plate alignment blocks 90 downward), and FIG. 8 depicts the plate alignment block stripper bolts 80 and the plate alignment blocks 90 in the unstressed position where the plate alignment block stripper bolts 80 and the plate alignment blocks 90 extend upward beyond upper surface of the main body of the lower fixture 30 so that the heat exchanger plate 120 may be positioned in the plate alignment blocks 90.

Figure 9A:
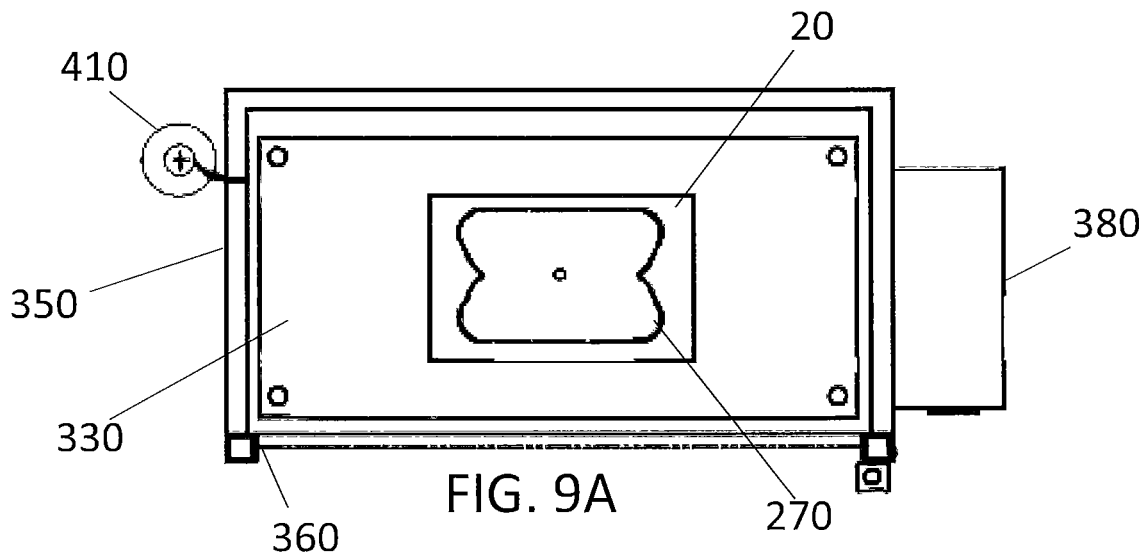
FIG. 9A shows a top view and FIG. 9B shows a front view of a heat exchanger plate leak detection assembly mounted to press tables according to an embodiment of the present application.
Figure 9B:
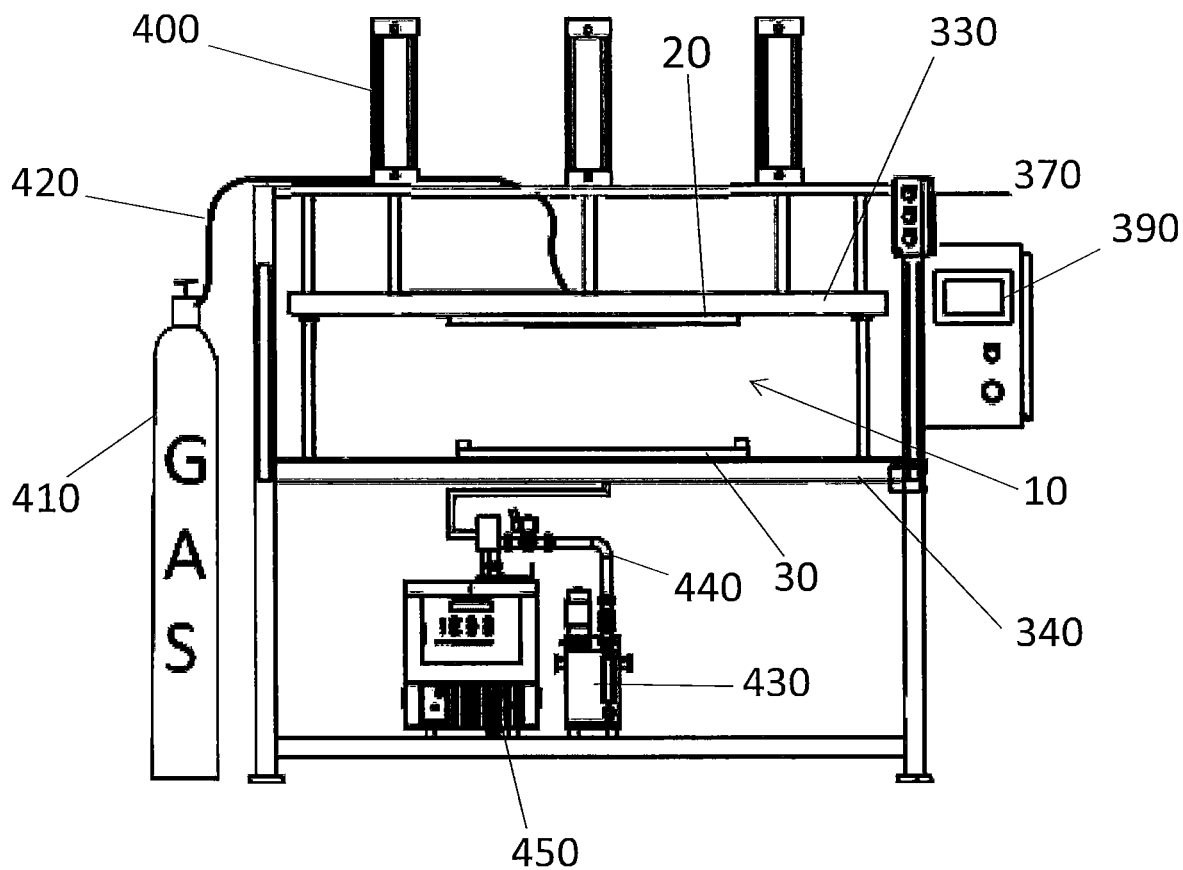

FIGS. 9A and 9B illustrate the leak detection assembly 10 being attached to and used with an upper press table 330 and a lower press table 340. FIG. 9A shows a top view where the upper fixture 20 and the second sealing gasket 270 are being shown in the installed position on the upper press table 330 (i.e., the upper fixture 20 and the second sealing gasket 270 are being shown as if they were visible through the upper press table 330). The closed loop configuration of the second sealing gasket 270 is also clearly shown in FIG. 9A. The upper fixture 20 may be installed (i.e., connected to) the upper press table 330 via threaded fasteners of the upper press table 330 that connect to the fastener holes 40 of the upper fixture 20 (e.g., see also FIG. 1). The upper fixture 20 is thus connectable to and removable from the upper press table 330. During leak detection testing of a heat exchanger plate 120, the upper fixture 20 may be connected to the upper press table 330 so that the upper press table 330 can move relative to the lower press table 340 (e.g., the upper press table 330 can move downwards and/or the lower press table 340 can move upwards) to cause the upper fixture 20 and the lower fixture 30 to seal the heat exchanger plate 120 as described above.

FIG. 9A further shows that there may be a perimeter guarding 350 provided around the periphery of the upper and lower press tables 330, 340 to protect and/or house the upper and lower press tables 330, 340. The perimeter guarding 350 may also prevent an individual from accidentally interacting with the upper and/or lower press tables 330, 340 when the leak detection testing is being performed. A light curtain 360 may be provided along one side of the perimeter guarding 350 (e.g., the front), and cycle indicator lights 370 may be provided to identify the status of the leak detection testing. The cycle indicator lights 370 are more clearly depicted in FIG. 9B. There may be three cycle indicator lights 370 as shown in FIG. 9B (e.g., green, yellow and red lights), or in other embodiments there may another number of cycle indicator lights 370. For example, a fourth cycle indictor light 370 may be a blinking light that indicates that a test is being performed and the other three lights (e.g., red, yellow and green) may indicate the results of the leak detection test (e.g., green shows that a leak has not been detected, yellow indicates a bad test such as possible leaking, the vacuum or seal is not held, too much vapor is being generated, etc., and red indicates that a leak has been detected).

FIG. 9A shows a top view of the main electrical control box 380, and FIG. 9B shows a front view of the main electrical control box 380, which includes an operator interface screen 390. Initiating the leak detection testing may be input by a user at the operator interface screen 390. The operator interface screen 390 may also provide information about the status and/or results of the leak detection testing.

FIG. 9B shows that the upper press table 330 may be connected to at least one press cylinder 400. The press cylinder 400 may be, for example, a pneumatic press cylinder that can drive the upper press table 330 downwards and upwards relative to the perimeter guarding 350. The press cylinder 400 is not limited to, however, to any particular type of driving device (e.g., a hydraulic pressing device or any other driving means may be used). FIG. 9B shows an exemplary embodiment with three press cylinders 400 connected to the upper press table 330 (e.g., at evenly spaced apart locations), but the number of press cylinders 400 is not limited in any respect. Some embodiments may instead or in addition utilize at least one lift cylinder to move the lower press table 340 relative to the upper press table 330 (i.e., the upper press table 330 may be stationary while the lower press table 340 is movable, or both press tables 330, 340 may move relative to one another).

FIG. 9B shows an inert gas source 410 being connected to the injection port 50 via an inert gas supply tube 420. The inert gas source 410 may be, for example, a tank that contains inert gas. For example, the inert gas source 410 may be a helium tank. The inert gas is not limited to helium, however, and may be another inert gas such as argon, neon, nitrogen, or mixtures thereof. The upper press table 330 may include a port or through-hole that the inert gas supply tube 420 may pass through to reach the injection port 50 of the upper fixture 20. By turning on the flow of inert gas from the inert gas source 410 (e.g., by opening the valve at the inert gas source 410), inert gas may thus be supplied into the second sealed space 290 via the inert gas supply tube 420 and the injection port 50.

A vacuum pump 430 is also depicted in FIG. 9B. The vacuum pump 430 (e.g., a chamber evacuation pump) may be configured to create a vacuum (i.e., draw a vacuum) by removing air from within the first sealed space 280 to steadily lower the pressure (i.e., when the first sealed space 280 is properly sealed) of the first sealed space 280. The vacuum pump 430 is thus connected to the suction port 300 via the vacuum connection tube 440. In some embodiments, the vacuum connection tube 440 may be relatively rigid and can be fixed relative to the lower press table 340 (e.g., fixed to the lower press table 340) if the upper press table 330 moves relative to the lower press table 340 while the lower press table 340 remains stationary for sealing the heat exchanger plate 120.

The heat exchange plate leak detection assembly 10 includes an inert gas detector 450 (e.g., a mass spectrometer) as shown in FIG. 9B. The inert gas detector 450 should be configured to detect the type of inert gas that is introduced into the second sealed space 290 from the inert gas source 410. For example, the inert gas detector 450 should be a helium detector (including a detector that can detect a variety of gasses, one of which is helium) when helium is used as the inert gas. The inert gas detector 450 may be connected to the vacuum connection tube 440 so that the inert gas detector 450 can sample gas drawn in through the vacuum connection tube 440 when the vacuum pump 430 provides suction in the first sealed space 280.

An example of one embodiment of performing leak detection for a heat exchanger plate 120 using the leak detection assembly 10 will now be described.

First, a user (e.g., a heat exchanger plate manufacturer seeking to test whether there are any leaks in a particular plate) may position the heat exchanger plate 120 on the lower fixture 30. The heat exchanger plate 120 may be appropriately positioned by abutting the heat exchanger plate 120 against the protruding surface of the plate alignment blocks 90 as described above, so that the heat exchanger plate 120 enters the recessed portion 110 of the plate alignment block 90.

The upper and lower fixtures 20, 30 may then be relatively moved towards one another (e.g., the upper fixture 20 may be lowered relative to the lower fixture 30 and/or the lower fixture 30 may be raised relative to the upper fixture 20), so that the upper and lower fixtures 20, 30 seal the heat exchanger plate 120. More specifically, the upwardly projecting gasket holder 230 may contact the gasket groove 150 of the heat exchanger plate 120 so that the first sealing gasket 240 seals against the surface of the heat exchanger plate 120 to create the first sealed space 280 when the upper and lower fixtures 20, 30 are relatively moved towards one another in this manner. The second sealing gasket 270 may simultaneously contact (i.e., be brought into contact with) the opposite surface of the heat exchanger plate 120 to create the second sealed space 290. The upper and/or lower fixtures 20, 30 may be moved by the upper and/or lower press tables 330, 340 to seal the heat exchanger plate 120. The upper and/or lower press tables 330, 340 may be moved relative to one another so that the upper and lower fixtures 20, 30 exert pressure on the heat exchanger plate 120 via the first and second sealing gaskets 240, 270 to help ensure the first and second sealed spaces 280, 290 are sealed from the outer environment. For example, a sealing force of 1-10 tons may be applied on the heat exchanger plate via the first and second sealing gaskets 240, 270. In this example, the first sealed space 280 will function as a vacuum chamber and the second sealed space 290 will function as an inert gas chamber. However, the chambers could of course be reversed. The heat exchanger plate 120 is now sealed between the lower fixture 30 and the upper fixture 20.

The inert gas source 410 may next be connected to the injection port 50 of the upper fixture 20 via the inert gas supply tube 420. The inert gas source 410 may instead be connected to the injection port 50 before the upper fixture 20 is moved relative to the lower fixture 30 to create the second sealed space 290 (in this example, a flexible tube of sufficient length should be used as the inert gas supply tube 420). After the heat exchanger plate 120 is sealed, inert gas (e.g., helium) is supplied or introduced into the second sealed space 290. The inert gas is typically supplied only after the seal is formed, but the inert gas supply is not limited in this respect as long as inert gas is contained within the second sealed space 290 after the heat exchanger plate 120 is sealed by the upper and lower fixtures 20, 30. A relatively small amount of inert gas may be supplied, for example, by opening the valve of the inert gas source 410 for only a few seconds (e.g., 1-15 seconds). In general, only a relatively small quantity of inert gas needs to be introduced into the first sealed space 280 in order for the leak detection test to detect inert gas in the event of a leak.

A vacuum is drawn in the first sealed space 280 using the vacuum pump 430 either concurrently with the inert gas injection or after the inert gas injection. Typically, the inert gas supply is stopped before the vacuum is drawn, but the disclosed method is not limited to ceasing the inert gas supply before the vacuum begins to be drawn and/or is drawn. It is then determined whether or not a vacuum can be maintained in the first sealed space 280.

While the vacuum is being drawn, the inert gas detector 450 is continuously sampling the gas in the vacuum connection tube 440. The inert gas detector 450 can thus immediately detect the presence of inert gas if any inert gas is drawn into the first sealed space through a crack, crevice or hole in the heat exchanger plate 120. The user may thus be immediately notified if there is a leak in the heat exchanger plate 120. The leak detection testing may involve holding a vacuum (typically, a specific pressure threshold is selected to indicate that a vacuum is effectively being maintained and any pressure value that remains below this threshold indicates that the vacuum is maintained—in other words, a perfect vacuum is not required because this may not be possible to achieve) for a predetermined amount of time. For example, the predetermined time to attempt to hold a vacuum may be in the range of 5-30 seconds. The heat exchanger plate 120 is thus determined to be leak tight (i.e., free of any cracks, crevices or pinholes) if the vacuum can be maintained (subject to the pressure threshold discussion above) for the predetermined time and no inert gas is detected by the inert gas detector 450. This is because the vacuum has not been broken by gas flow through a crack, crevice or pinhole in the heat exchanger plate 120 and the vacuum has not been broken by gas flow through or around the seal at the first sealing gasket 240. If the vacuum cannot be maintained for the predetermined amount of time and no inert gas has been detected by the inert gas detector, this means that the gas flow into the first sealed space 280 is through or around the first sealing gasket 240 (i.e., there is a deficiency in the seal of the first sealed space 280). If a determination is made that the gas flow into the first sealed space 280 is through or around the first sealing gasket 240, the first sealing gasket 240 is replaced with a new first sealing gasket 240 and the leak detection test is repeated in the same manner as that described above.

The above description refers to several components as being provided with the upper fixture 20 or lower fixture 30. However, this disclosure is not limited to providing the grooves, sealing gaskets, or sealed spaces on any particular side. For example, a vacuum could be drawn in a sealed space created between the upper fixture and the heat exchanger plate and inert gas could be supplied in a sealed space created between the lower fixture and the heat exchanger plate. Moreover, the present disclosure is not limited to having an upper fixture and a lower fixture. The longitudinal axes of the fixtures could extend vertically (instead of horizontally as shown in the exemplary embodiment in the figures), and thus the fixtures could be a right fixture and a left fixture.

The heat exchanger plate leak detection assembly disclosed here has useful application in a wide variety of settings and environments for improved NDT of heat exchanger plates.

The detailed description above describes a heat exchanger plate leak detection assembly and leak detection method. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A method for detecting a leak in a heat exchanger plate that possesses oppositely facing first and second sides and that is usable in a plate package forming part of a heat exchanger that exchanges heat between plural fluids, the heat exchanger plate being usable in the plate package so that the first and second sides of the heat exchanger plate each face a respective heat exchanger plate of the plate package, the method comprising:

positioning the heat exchanger plate on a first fixture comprising a first gasket groove, the first gasket groove containing a first seal gasket extending in a closed loop within the first gasket groove;

positioning the heat exchanger plate on a second fixture comprising a second gasket groove while the heat exchanger plate is positioned on the first fixture, the second gasket groove containing a second seal gasket extending in a closed loop within the second gasket groove;

the positioning of the heat exchanger plate on the first and second fixtures causing the first seal gasket to continuously directly contact the first side of the heat exchanger plate to create a first sealed space between the first fixture and the heat exchanger plate and causing the second seal gasket to continuously directly contact the second side of the heat exchanger plate to create a second sealed space between the second fixture and the heat exchanger plate;

supplying an inert gas into the second sealed space;

drawing a vacuum in the first sealed space while the inert gas is within the first sealed space;

detecting whether the inert gas is present in the first sealed space, with the detection of the presence of the inert gas in the first sealed space indicating that the plate is not leak tight;

determining the plate is leak tight when the vacuum is maintained for a predetermined time and the inert gas is not detected in the first sealed space; and determining that the method for detecting the leak must be repeated after replacing the first seal gasket with a new seal gasket when the vacuum cannot be maintained for the predetermined time.

2. The method according to claim 1, wherein
the inert gas is helium, and
the detecting whether the inert gas is present in the first sealed space is performed using a mass spectrometer.
3. The method according to claim 1, wherein the inert gas is supplied into the second sealed space via an injection port extending through the second fixture.
4. The method according to claim 1, wherein
the first gasket groove is within an upwardly projecting gasket holder possessing a rectangular cross-section and an open top portion, and
the second gasket groove is a rectangular groove in the second fixture with an open bottom portion.
5. The method according to claim 4, wherein
the first seal gasket possesses a vertically lower end and a vertically upper end when installed in the first gasket groove, the vertically lower end being rectangular to fit within the upwardly projecting gasket holder and the vertically upper end being rounded, and
the second seal gasket possesses a vertically lower end and a vertically upper end when installed in the second gasket groove, the vertically upper end being rectangular to fit within the rectangular groove of the second gasket groove and the vertically lower end being rounded.
6. A method for detecting a leak in a heat exchanger plate that possesses oppositely facing first and second sides and that is usable in a plate package forming part of a heat exchanger that exchanges heat between plural fluids, the heat exchanger plate being usable in the plate package so that the first and second sides of the heat exchanger plate each face a respective heat exchanger plate of the plate package, the method comprising:
positioning the heat exchanger plate between a first fixture and a second fixture to create both a first sealed space between the heat exchanger plate and the first fixture that is sealed from the outside and a second sealed space between the heat exchanger plate and the second fixture that is sealed from the outside, the positioning of the heat exchanger plate between the first fixture end the second fixture including positioning the heat exchanger plate so that a first sealing gasket directly contacts both the first side of the heat exchanger plate and the first fixture to create the first sealed space on the first side of the heat exchanger plate and so that a second sealing gasket directly contacts both the second side of the heat exchanger plate and the second fixture to create the second sealed space the second side of the heat exchanger plate;
supplying an inert gas to the second sealed space;
drawing a vacuum in the first sealed space; and
detecting whether the inert gas is present in the first sealed space, with the detection of the presence of the inert gas in the first sealed space indicating that the plate is not leak tight.
7. The method according to claim 6, wherein
the inert gas is helium, and
the detecting whether the inert gas is present in the first sealed space is performed using a mass spectrometer.
8. The method according to claim 6, wherein
the heat exchanger plate comprises four portholes, and
the first sealed space and the second sealed space are both created at the heat exchanger plate entirely interior to the four portholes.
9. The method according to claim 6, wherein
the first fixture houses the first sealing gasket, and
the second fixture houses the second sealing gasket.

10. The method according to claim 9, wherein when the vacuum cannot be maintained in the first sealed space and the inert gas is not detected, the method further comprises:
replacing the first sealing gasket with a new first sealing gasket; and
re-drawing the vacuum in the first sealed space to determine whether the plate is leak tight.
11. The method according to claim 6, wherein the supplying of the inert gas to the second sealed space is from an inert gas source located external to the first and second fixtures, the inert gas source providing the inert gas to the second sealed space through an injection port that extends through the second fixture.
12. The method according to claim 6, wherein
the first fixture comprises at least one alignment block, and
the positioning of the heat exchanger plate between the first and second fixtures comprises positioning the heat exchanger plate to abut the at least one plate alignment block of the first fixture.
13. A heat exchanger plate leak detection assembly for detecting a leak in a heat exchanger plate, comprising:
a first fixture comprising a first port and a projecting gasket holder extending continuously to form a first closed loop;
a second fixture comprising a second port and a gasket groove extending continuously to form a second closed loop;
a first seal gasket extending continuously within the first gasket groove in the first closed loop;
a second seal gasket extending continuously within the second gasket groove in the second closed loop;
the first fixture being configured to form a first sealed space when the first seal gasket is brought into contact with the heat exchanger plate, the first sealed space bounded by the heat exchanger plate, the first fixture and the first seal gasket;
the second fixture being configured to form a second sealed space when the second seal gasket is brought into contact with the heat exchanger plate, the second sealed space bounded by the heat exchanger plate, the second fixture and the first seal gasket;
a vacuum pump that communicates with the first sealed space via the first port extending through the first fixture, the vacuum pump being configured to reduce pressure in the first sealed space;
an inert gas source that communicates with the second sealed space via the second port extending through the second fixture, the inert gas source being configured to deliver inert gas into the second sealed space; and
an inert gas detector that communicates with gas drawn from the first sealed space by the vacuum pump to detect presence of the inert gas.
14. The heat exchanger plate leak detection assembly of claim 13, wherein the inert gas is helium and the inert gas detector is a mass spectrometer.
15. The heat exchanger plate leak detection assembly of claim 13, wherein the first fixture comprises a main body and at least one plate alignment block that extends upward beyond an upper surface of the main body of the first fixture, the at least one plate alignment block comprising a recessed portion, the heat exchanger plate being positionable in the recessed portion of the at least one alignment block to align the heat exchanger plate relative to the first fixture.
16. The heat exchanger plate leak detection assembly of claim 13, wherein the first and second fixtures are aluminum.

17. The heat exchanger plate leak detection assembly of claim 13, wherein the first fixture comprises a plurality of plate alignment blocks, the plate alignment blocks being spring-mounted so that the plate alignment blocks move relative to the projecting gasket holder of the first fixture when the first sealed space is formed.

18. The heat exchanger plate leak detection assembly of claim 17, wherein
the first fixture comprises a plurality of fixture alignment blocks, and
the fixture alignment blocks protrude from a main body of the first fixture in an opposite direction from the plate alignment blocks when the plate alignment blocks are in an unstressed position.

19. The heat exchanger plate leak detection assembly of claim 18, wherein the first fixture has four of the fixture alignment blocks, each of the four fixture alignment blocks being located at a respective one of four corners of the first fixture.

\* \* \* \* \*